US011080757B2

(12) United States Patent
Angelo

(10) Patent No.: US 11,080,757 B2
(45) Date of Patent: Aug. 3, 2021

(54) SYSTEM AND METHOD FOR CYCLIC RECOGNITION-PRIMED NOTIFICATIONS AND RESPONSIVE SITUATIONAL AWARENESS IN AN ADVERTISING DISPLAY NETWORK

(71) Applicant: Mindports AI, Inc., Las Vegas, NV (US)

(72) Inventor: Michael De Angelo, Newton, MA (US)

(73) Assignee: MINDPORTS AI, INC., Las Vegas, NV (US)

( * ) Notice: Subject to any disclaimer, the term of this patent is extended or adjusted under 35 U.S.C. 154(b) by 344 days.

(21) Appl. No.: 15/705,204

(22) Filed: Sep. 14, 2017

(65) Prior Publication Data

US 2018/0005275 A1    Jan. 4, 2018

Related U.S. Application Data

(63) Continuation of application No. 14/075,716, filed on Nov. 8, 2013, now abandoned.

(60) Provisional application No. 61/818,416, filed on May 1, 2013, provisional application No. 61/772,220, filed on Mar. 4, 2013.

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0267* (2013.01)

(58) Field of Classification Search
CPC ................ G06Q 30/0269; G06Q 30/0267
USPC ............................................ 705/14.4, 14.73
See application file for complete search history.

(56) References Cited

U.S. PATENT DOCUMENTS

| | | | |
|---|---|---|---|
| 4,359,631 | A | 11/1982 | Lockwood |
| 4,567,359 | A | 1/1986 | Lockwood |
| RE32,115 | E | 4/1986 | Lockwood |
| 4,819,191 | A | 4/1989 | Scully et al. |
| 4,866,611 | A | 9/1989 | Cree et al. |
| 5,309,355 | A | 5/1994 | Lockwood |

(Continued)

OTHER PUBLICATIONS

Howe, A., et al., "SavvySearch: A Meta-Search Engine that Learns which Search Engines to Query," AI Magazine (Jan. 28, 1997).

*Primary Examiner* — Sun M Li
(74) *Attorney, Agent, or Firm* — Hudnell Law Group PC

(57) ABSTRACT

A system for generating improved notifications relating to events is disclosed. The system includes a sensing network including an event sensor configured to sense events. The system further includes a sensed-event processing system configured to append meta data to information associated with a sensed event. The system further includes a human-machine interface and at least one communication unit configured to communicate amongst the human-machine interface, the sensing network, and the sensed event processing system, the information communicated from the sensing device via the at least one communication unit. The system further includes a notification generation system configured to generate a notification to a user of the human-machine interface, the notification content including at least one user-selectable action option. The communication unit configured to communicate the notification via the human-machine interface and select the notification content, the notification type, or the means of notification based on the meta data.

35 Claims, 16 Drawing Sheets

(56) References Cited

U.S. PATENT DOCUMENTS

| | | | |
|---|---|---|---|
| 5,493,692 A | 2/1996 | Theimer et al. | |
| 5,576,951 A | 11/1996 | Lockwood | |
| 5,684,476 A | 11/1997 | Anderson | |
| 5,836,529 A | 11/1998 | Gibbs | |
| 5,902,352 A | 5/1999 | Chou et al. | |
| 5,938,721 A | 8/1999 | Dussell et al. | |
| 6,006,222 A | 12/1999 | Culliss | |
| 6,016,478 A | 1/2000 | Zhang et al. | |
| 6,195,654 B1 | 2/2001 | Wachtel | |
| 6,289,319 B1 | 9/2001 | Lockwood | |
| 6,289,343 B1 | 9/2001 | Freund et al. | |
| 6,496,872 B1 | 12/2002 | Katz et al. | |
| 7,010,536 B1 | 3/2006 | De Angelo | |
| 7,231,380 B1 | 6/2007 | Pienkos | |
| 7,702,682 B2 | 4/2010 | De Angelo | |
| 7,819,315 B1 | 10/2010 | Pienkos | |
| 7,873,682 B2 | 1/2011 | De Angelo | |
| 2012/0271715 A1* | 10/2012 | Morton | G06Q 30/0257 705/14.53 |

* cited by examiner

SYSTEM AND METHOD FOR CYCLIC RECOGNITION-PRIMED NOTIFICATIONS AND RESPONSIVE SITUATIONAL AWARENESS IN AN ADVERTISING DISPLAY NETWORK

This application is a continuation application which relates to and claims priority under 35 U.S.C. § 119(e) to U.S. patent application Ser. No. 14/075,716 filed on Nov. 8, 2013 and titled "SYSTEM AND METHOD FOR CYCLIC RECOGNITION-PRIMED NOTIFICATIONS AND RESPONSIVE SITUATIONAL AWARENESS IN AN ADVERTISING DISPLAY NETWORK" which claims priority under 35 U.S.C. § 120 to provisional applications Nos. 61/772,220, filed on Mar. 4, 2013, and 61/818,416, filed on May 1, 2013.

BACKGROUND OF THE INVENTION

1. Field of the Invention

The present disclosure relates generally to a system and method on computer hardware and software system display or notification means for enabling and improving user engagement through responsive iterative and cyclic interaction using mobile devices, for the creation of, response to, or alteration of, notifications on public display screens.

The present disclosure further relates to a system and method on a computer hardware and software system for implementing, by delivering notification content, notification type, and means of notification, an iterative or cyclic response by users responsive to sensed or observed real world events and computer system events.

The present disclosure further relates to a system and method on a computer hardware and software system display or notification means for synthesizing user interaction originating on groups of mobile devices in order to, through responsive cyclic iterative interaction, create, respond to, or alter, at least two separate and separately sourced simultaneously occurring notifications on a public display screen or screens.

The present disclosure further relates to a system and method on computer hardware and software system display or notification means for enabling and improving user situational awareness, cognition, and response, by recognizing and delivering, for a response option, cyclic, iterative responses through any means to notifications on a display means.

The present disclosure further relates to a system and method on a computer hardware and software system to identify optimal contextual, situation-aware, and user-dialogue-responsive advertising.

The present disclosure further relates to the further processing of sensed, inputted or captured real world events, including, but not limited to events stored or occurring in mobile devices, resulting in, with or without further ongoing user input, an instruction to be sent to a system causing an action in the real world, further sensing in the real world, or a change in a computer system or computer system display means.

The present disclosure further relates to a decision support system generating action options intended for presentation to a user that are responsive to sensed real world events and inputted events, whether further processed or unprocessed, and computer system events, and notification generation system events.

The present disclosure further relates to a notification generation system generating notifications including notification content, notification type, and means of notification intended for presentation to a user that are responsive to sensed or real world events and inputted events, whether further processed or unprocessed, and computer system events.

The present disclosure further relates to the cyclic or iterative response by users, groups of users, or more than one group of users, to notifications, including notification content, notification type, and means of notification, on a public display screen or screens.

The present disclosure further relates to the recognition, quantification, and qualification by a computer system of user responses to, and evaluations or ratings of, presented action options, notifications, notification types, or notification means in order to improve the quality and effectiveness of a decision support system and/or a notification generation system.

The present disclosure further relates to using data generated by the observation logging, quantification and qualification of a user interacting with or responding to a decision support system including action options, to further refine the effectiveness of that decision support system.

The present disclosure further relates to using data generated by the observation logging, quantification and qualification of a user or groups of users interacting with or responding to a notification generation system including notifications content, notification types and notification means to further refine the effectiveness or result of that notification system or a decision support system, including the effectiveness of action options offered by that decision support system or notification system in public locations such as neighborhoods, shopping malls, airports, commercial shopping districts, movie theaters, public arenas, public events, movie theaters, or stadiums.

The present disclosure further relates to the integration of decision support systems and notification generation systems with motion control systems and telematic systems.

The present disclosure further relates to the integration of decision support systems and notification generation systems to effect the alteration of a software system or computer network.

The present disclosure further relates to a sense and respond system in an advertising network learning from the context of a sensed or inputted events or computer system events.

The present disclosure further relates to the observation and comprehension of user interaction with action options presented by a decision support system or a notification generation system in response to events sensed, observed, or inputted from the real world.

The present disclosure further relates to the further processing of sensed, observed, inputted, or captured real world events, including, but not limited to events stored in, or processed through, mobile devices, or computer network events in present time or a duration of time or times, in a location or a radius of location or locations, comprising the event of any change or condition, or a range of change or condition, resulting in, with or without further ongoing user input, an instruction to be sent to a system causing an action in the real world or further sensing in the real world, or a change in a computer system, or computer display means.

The present disclosure further relates to a decision support system generating action options intended for presentation to a user that are responsive to sensed or observed real world events and inputted events, whether further processed or unprocessed, and computer system events, and decision support system events intended to inform a notification generation system and a heuristic system.

The present disclosure further relates to a notification generation system generating notifications including notification content, notification type, and means of notification intended for presentation to a user, a group of users, or more than one group of users, that are responsive to sensed real world events and inputted events, whether further processed or unprocessed, and computer system events.

The present disclosure further relates to the recognition, quantification, and qualification by a computer system of user responses to presented action options, notifications, notification types, or notification means in order to improve the quality and effectiveness of a decision support system and/or a notification generation system.

The present disclosure further relates to the integration of decision support systems and notification generation systems with motion control systems and telematics systems.

The present disclosure further relates to the integration of decision support systems and notification generation systems with location-related Web and mobile Web based advertising, itineraries, or promotions associated with the geographical locale, or a range of time, of an advertisement's service or product offering geographic area or time period of offer.

The present disclosure further relates to the integration of decision support systems and notification generation systems to effect 1) the initiation, control, interaction with, or communication with, stationary, vehicular, or moving platform guidance, support and control of telematic actions, including robotic motions, and 3) the alteration of a software system, computer network, or computer network display means.

The present disclosure further relates to the customization or personalization by a user of inbound notification content, inbound notification means, and inbound notification preferences, including the conditional state of receptivity of the user or of a user mobile device to inbound notifications.

The present disclosure further relates to a system learning from the historical pattern of a user, or set or class of user, or more than one class or set of users, selections of action options, and quantified and qualified responses to, and evaluations or rating of, notification content, notification type, or notification means.

The present disclosure further relates to a sense and respond system in an advertising network learning from the context of a sensed, observed, or inputted events or computer system events, including but not limited to the type or class of vehicle, such as SUV, luxury sedan, economy, or the fuel efficiency rating of vehicle, the time of day, traffic conditions, or weather conditions, or from the user devices setting for inbound notification content, whether a promotional offer set at a ten percent discount or a fifty percent discount or other condition, for inbound notification type, whether in a particular circumstance or context an alert is preferred over an advisory type, or for inbound notification means, whether visual, auditory, or other, is preferred, or from sensed or observed events occurring within an automobile interior, such as coughing, or with a shopping mall, such as loud voices from a group of passing adolescents.

The present disclosure further relates to the use and evolution of action options, notification content, notification types, or notification means as generated by a decision support system or a notification generation system operating to respond to sensed events in order to enable a user to rapidly and intelligently respond to situational changes and needs.

The present disclosure further relates, by the recognition of, quantification, and qualification of user responses, evaluations or ratings, and/or the election of action options, to the teaching and training of robots, hardware-software systems, decision support systems, and notification generation systems.

The present disclosure further relates, by the recognition of, quantification, and qualification of user responses, direct evaluations, and/or election of action options within an integrated decision support system and notification generation system, to the teaching and training of users.

The present disclosure relates to a system and method on a computer hardware and software system for dialogue and dialogue controls between consumers and advertisers concerning goods, services, pricing, offers, and types, timing, means, and conditions of advertisement.

The present disclosure relates to a system and method on a computer hardware and software system display or notification means for improving user situational awareness, cognition, and response, by recognizing and delivering, for notification content, an illumination, by a notification type or notification means, of the category or division of the source of the notification content presented.

The present disclosure further relates to a system and method on a computer hardware and software system display or notification means for improving user situational awareness, cognition, and response, by recognizing and delivering, for a response option, an illumination, by a notification type or notification means, of the category or division of the result vector arising from the selection of the response option presented, or the fact of the existence of a real-world response result vector.

The present disclosure further relates to a system and method on a computer hardware and software system to identify optimal contextual, situational aware, and user dialogue responsive advertising.

1. Description of the Related Art

Real-world sensing systems, including but not limited to those capturing geolocation, temporal radius, duration, or segment, or video, audio, visual recognition of any kind, radar, and sonar, magnetic, motion, or haptic sensing, or observed, sensed, or inputted events, generally send input directly to video or computer screens unmediated by computer system decision support systems or notification generation systems, or simply identify a sensed event as a recognized event in order to create an alert, notification, or corresponding notification about that event.

Sensed events are generally not processed to combine with meta data, attributes, or variables about that event in a way specifically intended to work with a decision support system and/or a notification generation system.

Events are generally not created by users' combined presence in one location, nor is there any cyclic feedback loop with user created events as presented on public display screens.

Excluding autonomous robotics, the results of computer software systems through which the real world is sensed and interacts with user cognition is generally presented on computer display screens different than those through which user cognition responds to, or guides interaction with, that which is sensed or observed. The sense and respond cycle does not during its operation include the quantification or qualification of user response or evaluation of the system operating to present notifications of action options.

In systems where users are presented with sensed events and action options on the same screen, those action options may not have been enhanced or coded as to their value, urgency or intensity, or not selected by a decision support system, or notifications may not have been processed through a notification generation system evolving to create more effective notification content, notification means, or notification types for an individual user or defined set or class of users.

In those systems where decision support systems and notification generation systems work together, a notification or notification type may be simply bound to a particular recognized event through a one-to-one corresponding matching.

Response interface screens or means do not generally include the means to track the response time of a user once they are presented with an action option or upon their failure to act.

Response interface screens or means do not generally include the means for 1) a user to directly reject one or more, or all, action options presented, 2) the computer system to report a lack of response after a set time (a null) if there is no response from the user, 3) the user to view and select alternative action options not initially presented as optimal, 4) the system to record, integrate, or learn from the lack of response of a user, the time taken to respond by the user, the rejection of action options or notifications by the user, the selection of alternate action options by the user, or the evaluation or ratings of presented notification or action options by a user.

Response interface screens or means do not generally include the means for the user to customize or personalize the settings for notification content, notification type, or notification means for a notification, an advertisement, or an offer.

Advertisers are constantly seeking to increase engagement with audiences.

Historically, consumers are considered to be targets of advertising rather than subjects to participate in real-world related events.

Whereas web-based gaming joins multiple users in cyberspace, it does not join them related to their actual presence in such places as shopping malls, airports, commercial shopping districts, public arenas, movie theaters, or stadiums.

The dramatic increase in large display screens in public places offers the opportunity to create or engage consumers with their mobile devices and public display screens in a way that increases their interest in buying, associating, or giving loyalty to brands, goods or services, in their present or near time or location, or in providing valuable association with same.

Historically, no technology has been developed offering user engagement through mobile devices while simultaneously and interactively offering engagement through large public display screens.

Therefore, there is a need for consumers using mobile devices, and large display screens where those users are physically located or where those users might see and interact with those display screens presenting sensed or observed events, including events created by the present users themselves, to be linked in new ways to accomplish new levels of joint engagement.

There is a further need for users with mobile devices in physical locations with public display screens in such places as neighborhoods, shopping malls, airports, commercial shopping districts, movie theaters, public arenas, public events, or stadiums to be linked to each other and to other observing and interacting users watching through television, Web television, podcast, or other observation means in order that those users not physically present might participate with those users physically present in events occurring on public display screens in those physical locations.

Existing transport-to-buy or navigate-to-buy systems generally utilize a database of pre-existing goods or services locations for pre-existing providers of goods and services. Updates may occur periodically through linking to means of updating same as opposed to interacting with the real-time Web and mobile Web, including current user reviews or ratings.

Users of such transport-to-buy or navigate-to-buy systems may view these locations and then manually enter addresses into the navigation system, or in some cases, select those goods or services locations to automatically feed into the navigation system.

Advertisers are constantly seeking to understand identify, and incentivize consumers to buy.

Historically, advertisers use data and data analytics regarding consumers in which the consumer individually, collectively, or in groups, is studied as an object.

Historically, no technology has been developed offering the consumer the means to participate in advertising or offers as a subject presenting their buying interest to sellers and advertisers.

Therefore, there is a need for a hardware-software advertising system to receive solicitous communications from users regarding stated preferences for, including but not limited to, desired goods or services, desired pricing or discount level, distance radius where goods or services are available, time window for desired shopping time or receipt of an advertisement or offer, desired notification type of an advertisement, desired notification means of an advertisement.

Further, there is a need for a means for a user to hold and make available to external systems through a mobile device desires and preferences for acceptable advertising and offers according to, separately or in any combination, 1) a time period and/or radius of distance, 2) the type of system that may access it, whether controlled by a password, key, definition, or other, of an inquiring system, 3) one of the set-by-user states of a) broadcast data openly for any system to hear 165, b) allow data to pass to all inquiring systems, c) allow a system to submit an approval request for approval by the user, or d) do not allow data to pass to inquiring systems, 4) any of the preceding according to a list of acceptable inquiring systems, 5) any of the preceding in (3) according to a window of time and/or radius of distance, 6) any of the preceding in according to the recognition of shared presence or presence not shared.

There is a need to present users with live mobile Web advertisements or offers that include specific action options through notification systems allowing for separate generation of notification content, of notification type, and of notification means, apart from that advertisement of offer or the associated action option.

There is a need to enable the means for the user to customize or personalize for an inbound notification, advertisement, or offer, the desired notification content, type, or means, including but not limited to factors of time or place of delivery, location of home, work or drive route of a user, user's desired discount level, user's desired product, user's handicaps, age, sex, educational level, zip code, or other user set preferences, in order that those preferences might be next received by an on-board vehicular computer, or advertising display network in public display or on a mobile device, such as by near field communications, long range RFID, blue tooth, a wireless or cellular network, or computer network.

There is a need for a notification generation system operating independently, but not without reference to, a decision support system, that provides action options to a user based upon rules established for responding to real world events in particular contexts.

For example, in an automobile, a collision avoidance system might begin pumping the brakes with an ABS system, while a sound announces the action. In this case the action option is hardwired, as is the notification type. By contrast, a decision support system might present more than one action option to a user such as "brake," and "swerve." A notification generation system might review more than one notification content, i.e., "collision danger," or "approach danger" in order to present one of those to the user, and consider more than one notification type such as in the form of a warning or an alert, and more than one notification means, such as a voice command or flashing light, in order to select one from each of these in order to generate and present a notification to a user. The separate review and selection of action options, notifications, notification types, and notification means enables a computer system to generate increasingly more effective action options and notifications to assist a user in effecting rapid informed actions in a computer system or in the real world in response to events in the real world and in that computer system.

For a second example, in a shopping mall, or public venue, a certain advertisement campaign might be triggered by a certain volume or density of consumers in a sensed area, or another be triggered by determining the estimated average age of consumers present by calculating their walking speed, with the faster speeds attributed to young persons or adolescents, or the sound signature of their voices, with louder voices attributed to young persons or adolescents.

There is a need for a user to be provided with a means to control on personal mobile devices, including but not limited to tablets and smart phones, whether personal content will be pushed, or allowed to be pulled, according to any given time, location, requesting entity, audience, qualification, or other, through any technological means, including but not limited to near field communications, blue tooth, long range RFID, or a wireless or cellular network, with content items lacking designated "neutral" and subject to a request to be pulled, to be confirmed by a user.

For example using a similar system as earlier described in a distributed display network such as those used in airports, shopping districts, shopping malls, or gas stations, advertisements and notifications might be generated based upon gestures, voices, pedestrian patterns, news events, weather conditions, or any real world condition, or the received pushed or pulled preferences and requests of user or the mobile devices of users, or allowed pulled preferences and requests, from the personal mobile devices of passing users, by the means of, including but not limited, to near field communications or long range RFID communications or wireless or mobile wireless networks, triangulated Wi-Fi signals, or detectable flashing LED's with the response to those advertisement and notifications being utilized to generate more effective and personalized advertisements and notifications, including, but not limited to, a link to the means to provide step by step navigation to the location of desired goods or services.

Upon entering a mall, the user may have a personal mobile device set to push a request for running shoes that are discounted at least 50%. The mall system may respond with a request to pull additional information from the user's personal mobile device. Upon acceptance by the user, the mall system would pull content designated as receptive to being pulled, or content designated as neutral, such as the zip code of the user, based upon the user's confirmation of the mall system request. The mall system may recognize user's photos in content, through the means of a meta data tag or by other means, to be associated mostly with sports events and therefore a prime customer, or associated with a social network profile with associated meta data, and generate a personalized offer from the sports franchise store for the desired item plus team baseball caps. The same process might also occur at a gas station, or in the objectives of operators in operating situational awareness in sense and respond systems, with notifications and action options substituting for advertisements and offers.

There is a need for a distinct, recognizable notification, action button and system on the Web, mobile Web, or on a computer system or computer network, that can attach to an advertisement or offer on the Web or mobile Web, or a distinct symbol, shape, icon, or representation, that will cause the navigation system in a vehicle to be addressed, enabling the user to select the button and receive visual and/or audio guided instruction or support to reach the real-world location where the goods or services advertised exist or cause the vehicle, with or without a user controlling it, to proceed to that destination.

There is a need for a distinct, recognizable, action button and system on the Web and mobile Web, or on a computer system or computer network, that can attach through the action of a decision support system to a particular sensed or observed event in the real world appearing on an on-board vehicular computer system, computer system display means, and/or mobile device to generate an option to initiate an alteration in control to a sensing system, guidance system, decision support system, notification generation system, motion control system, navigation system, robotics system, weapons firing system, defensive countermeasures system, or computer display means.

There is a need for users to be able to control by multiple and diverse parameters, the type of advertising, through what means, at what times, and in what locations, for what goods or services, at what levels of discount, and other, expressed as stored preferences for inbound notifications or advertisements in digital devices, including but not limited to smart phones, tablets, and on-board vehicular computers, and maintained as an ongoing dialog between stored preferences in personal devices or vehicles computer systems on one side, and notification content, types and means in advertising networks including offers responsive to those preferences or requests from one or more personal mobile devices or on-board computers in vehicles on the other side.

There is a need to unify on or through a single computer system or response interface means of a computer display screen, 1) action options, 2) alternate action options, 3) real world feeds with one or more action options, 4) notification content, 5) notification types, 6) notification means, 7) a means for a user to evaluate or rate an action option or notification, 8) a means for the system to record a lack of response within a designated time, 9) a means for a user to reject one, more or all notifications or action options, and 10) a means for a system to record the amount of time a user takes to respond after a notification is presented.

There is a need for a notification generation system to generate notification content, notification type, and notification means through the evaluation or integration of human factors including but not limited to training level, fatigue level, fear level, threat level, age, mental acuity, response time, ergonomic human comfort, and ergonomic human movement.

There is a need for a user, or groups, classes, or sets of users, to teach, train, interact with, or affect, decision support systems and/or notification generation systems, specifically, through the use of direct negatives, rejecting one, or more, or all of the presented action options of a decision support system, or through the use of nulls, being a complete lack of response to the presented options of a decision support system or notification generation system, or through the selection of alternate action options, through the recognition and integration of responsive action not emerging from or part of the system herein described, or through the use of direct user input through any means to the system described herein.

There is a need for a user, or groups, classes, or sets of users, to teach, train, interact with, affect, contrast, juxtapose, challenge, or compete with another user, class of user, set or sets of users or group or groups of users through 1) the use of response time quantification to the presented action options of a decision support system and/or notification generation system, or 2) the use and presentation of alternate secondary action options to the presented action options of a decision support system or intelligence, or a notification generation system, or 3) the use of direct rejections of actions options or notification, or 4) the system recording of a lack of response to direct action options or notifications, or 5) the iterative or cyclic response to notifications presented on a computer display means, whether in mobile devices or a public display screen.

There is a need for a user to be provided a means to input an evaluation in a quantitative or qualitative rating of the performance of a decisions support system pertaining to the real world efficacy of the one or more action options, or input an evaluation per event, set of events, or pattern of events, per action option or action.

There is a need for a user to be provided a means to input an evaluation in a quantitative or qualitative rating of the performance of a notification generation system pertaining to the real world efficacy of the response to one or more presented action options, or input an evaluation per event, set of events, or pattern of events, per action option or action.

There is a need for a hardware-software system to integrate a means to evaluate a user through the quantitative or qualitative rating of the performance of a user interacting with a decision support system pertaining to the real world efficacy of the one or more action options, per event, set of events, or pattern of events.

There is a need for a hardware-software system to integrate a means to evaluate a user through the quantitative or qualitative rating of the performance of a user interacting with a notification generation system pertaining to the responses made by a user to presented action options pertaining to real world efficacy of the one or more action options, per event, set of events, or pattern of events.

There is a need for a hardware-software system to integrate a means to evaluate a user through a quantitative or qualitative rating of the performance of a user interacting with a decision support system pertaining to the real world efficacy of the one or more action options by interpolating it in the context of a mission completion evaluation by a user per event, set of events, or pattern of events, action options or actions.

There is a need for a hardware-software system to integrate a means to evaluate a user through a quantitative or qualitative rating of the performance of a user interacting with a notification generation system pertaining to the real world efficacy of the notification generation system in the presenting of one or more action options by interpolating it in the context of a mission completion evaluation by a user per event, set of events, or pattern of events, action options or actions.

There is a need to generate more effective action option and notifications through elements permanently established and uniquely identified through the lifetime of a system interacting in a continuous heuristic loop where each loop is further processed through the entire system.

There is a need to incorporate within a storage means a means to store individually, each as a snapshot 77 containerized in a logical container with meta data, each event, sensed event, or inputted event, each computer system event, each logically completed, induced, inferred, deducted, or inducted process, sub-process, or super-process, each occasion of each action option or options offered, each occasion of the selection of each option action, and each occasion of each notification including its identified content, its type, and its mean, through such logical, mathematical, and/or software-based methodology, including but not limited to logical containers with associated meta data, as will enable such processes to be referenced, incorporated and utilized in a decision support system, notification system, or learning system comprising a decision support system and a notification generation system.

There is a need for a decision support system to generate events in the form of a decision support event as will not only generate action options, but inform a notification generation system with such information or meta data as will aid that notification generation system in generating notifications.

There is need for a notification system, including notification content, notification type, and notification means, to receive its own inputted data streams and operate on its own rules, independently, but not without referencing, the decision support events generated by a decision support system in order to most effectively notify users of events and present them with easily and quickly comprehensible action options to effect rapid responsive actions in the real world.

There is a need for a decision support system to offer, record, quantify, qualify, correlate, average, process, algorithmically derive or synthesize the interaction of users, groups of users, or set of users selecting presented action options or action options not first presented by the decision support system as the algorithmic optimum.

There is a need for a decision support system to offer, record, quantify, qualify, correlate, average, process, algorithmically derive or synthesize the interaction of users, groups of users, or set of users responding to observed events on public display screens.

Computers systems of diverse purpose and design are becoming increasingly networked.

Computer displays on one screen or notification means include multiple sources of information.

Interacting networks are becoming increasingly capable of effecting actions in the real world by selecting options on computer displays and by other means.

However, users cannot easily discern or discriminate, or judge the integrity or veracity of presented information or notifications without knowing the kind or category of the source of the information, e.g., a still photo from a live Web cam vs. a Photoshop altered image.

Currently, multiple information sources appear without differentiation as to their category or division of source on a hardware-software system, comprising information sourced from 1) hardware-software systems, 2) live video, web cams, or audio of real world scenes and events, 3) user direct reporting of real world events experienced by the user, 4) heuristic algorithmic, symbolic, or pattern-related, analytic computation, such as personalization, 5) hardware-software system sensing and processing the real world such as the determination of location, or the time of occurrence of event, including but not limited to, including but not limited to sensing devices, vehicle related computation, or robotic-related computation, 6) user comments, reviews, or choices, in response to real world events experienced by the user in the real world, 7) user comments, reviews, or choices, in response to information presented on a hardware-software system, 8) heuristic expert, rules-based, symbolic logic based, pattern matching, pattern recognition, or other computational means making determinations regarding hardware-software sensed real-world events, 9) heuristic expert, rules-based, symbolic logic based, pattern matching, pattern recognition, or other computational means making determinations regarding hardware-software system events, or other unidentified information sources, 10) to be described herein, user stated preferences of objectives intended to affect or solicit advertising or offers, or 11) a stored representation of any of the preceding.

Currently, user selectable response options appear without differentiation as to their category or division of consequential result vector, or the fact of the existence of an associated consequential real-world response result vector, on a computer display, the selection of such option resulting in the effect upon, alteration of, a 1) a hardware-software system, 2) live video, web cams, audio sensing or other recording and sensing means, or their fixed or moving platforms, 3) a carbon-based life form, 4) heuristic algorithmic, symbolic, or pattern-related, or analytic computational result, including but not limited to, hardware-software systems, sensing devices, vehicle related computation, or robotic-related computation 5) a hardware-software system sensing and processing the real world, 6) user comments, reviews, or choices, in response to real world events experienced by the user in the real world, 7) user comments, reviews, or choices, in response to information presented on a hardware-software system, 8) heuristic expert, rules-based, symbolic logic based, pattern matching, pattern recognition, or other computational means making determinations regarding hardware-software sensed real-world events, 9) heuristic expert, rules-based, symbolic logic based, pattern matching, or other computational means making determinations regarding hardware-software system events, or other unidentified information sources, 10) to be described herein, user stated preferences of objectives intended to affect or solicit advertising or offers, or 11) a stored representation of any of the preceding.

Further, unlike events in the digital world, events in the real world are generally irreversible.

Therefore, there is a need to know, when information in presented to a user on a hardware-software system, for the user to be informed of the category or division of the source from which that information is being sourced.

Further, there is a need to know, before a response option is selected through a hardware-software system by a user, for the user to be informed of the category or division of the result vector that will arise from the selection of a response option.

Further, there is a need, once such selection has been made, for the user to be able to abort the selection.

Further, there is a need for the individual user, by self-consideration, and consideration of the situational context of the presented response options, and of the consequential result vector, to be able to set the duration of the abort time.

Further, there is a need for a means for a user to hold and make available to external systems desires and preferences according to, separately or in any combination, 1) a window of time and/or radius of distance, 2) the type of system that may access it, whether controlled by a password, key, definition, or other, of an inquiring system, 3) one of the set-by-user states of 1) allow data to pass to all inquiring systems, 2) allow a system to submit an approval request for approval by the user, or 3) do not allow data to pass to inquiring systems, 4) any of the preceding according to a list of acceptable inquiring systems, 5) any of the preceding according to a window of time and/or radius of distance, 6) any of the preceding according to the recognition of shared presence or presence not shared.

It would be advantageous for a user, class of user, set or sets of users or group or groups of users to teach, train, interact with, affect, contrast, juxtapose, challenge, or compete with another user, class of user, set or sets of users or group or groups of users through 1) the use of response time quantification to the presented action options of a decision support system and/or notification generation system, or 2) the use and presentation of alternate secondary action options to the presented action options of a decision support system or intelligence, or a notification generation system, or 3) the use of direct rejections of actions options or notification, or 4) the system recording of a lack of response to direct action options or notifications, or 5) the iterative or cyclic response by any means to notifications or events presented on a computer display means, whether in or by mobile devices or on or through a public display screen.

It would be advantageous for users with mobile devices in physical locations with public display screens in such places as neighborhoods, shopping malls, airports, commercial shopping districts, movie theaters, public arenas, public events, or stadiums to be linked to other observing users watching through television, Web television, podcast, or other observations means in order that those users not physically present might participate with those users, groups of users, or sets of users physically present in events and responses occurring on public display screens in those physical locations.

It would be advantageous to provide users with a means of storing multiple preferences and parameters in their personal mobile devices, including but not limited to smart phones and tables, and on-board computers in vehicles, pertaining to the preferred location, or time of receipt for a notification, advertisement, or offer, the level of discount, the kinds of goods or services offered, and others, such that those preferences might communicate with an advertising network and system designed to respond to those preferences.

It would be advantageous to provide a user with a means to indicate whether any given piece of content or stated preference might be pushed to an outside network, or pulled from an outside network, or designated as neutral and subject to an inquiry for access.

It would be advantageous to enable a hardware-software system including a decision support system and a notification generation system to be mutually recursively iterative or cyclic, including but not limited to processing the context of sensed events, the direct rejection of one, more, or all action options by users, the time of response taken by a user to select an action option after it is presented, action options selected that are presented not in the first group of presented action options, action options that are taken outside of the system, or the quantified, qualified, correlated, averaged, processed, algorithmically derived, or mathematically synthesized interaction of users, groups of users or set of users, or more than one group of users or set of users as used or presented through, or offered for response through, any notification type or means on public display screens or mobile devices.

It would be advantageous in generating more effective action options and notifications to utilize elements permanently established and uniquely identified through the lifetime of a system interacting in a continuous heuristic loop where each loop is further processed through the entire system.

It would be advantageous to provide diverse and separate rules sets that might be integrated and interactive within a decision support system and within a notification generation system.

It would be advantageous to provide a notification type rules set and a notification means rules set governing the manner or form in which a notification is delivered, and the means of delivering that notification, separately from the rules governing the creation of the content of the notification itself, or separately, but not without reference to, the operation of a decision support system generating action options in response to sensed events.

It would be advantageous to incorporate direct user evaluation inputted in a quantitative or qualitative rating of the performance of the decisions support system, and/or the notification generation system pertaining to the responses made by a user to presented action options, pertaining to real world efficacy of the one or more action options, per event, set of events, or pattern of events, and/or a mission evaluation rating pertaining to the real world efficacy of the one or more action options, per event, set of events, or pattern of events.

It would be advantageous to incorporate a means for the hardware-software system to evaluate in a quantitative or qualitative rating the performance of the decisions support system, and/or the notification generation system, and/or a mission evaluation rating pertaining to the real world efficacy of the one or more action options, per event, set of events, or pattern of events.

It would be advantageous on an interface means to present to a user direct technological sensing, such as a video feed, and action options alongside or in parallel with notifications and action options generated by a decision support system and/or a notification generation system in order that comparisons of effectiveness between the two might improve the decision support system and notification generation system.

It would be advantageous to provide a user, a group of users, or a set of users, or more than one user, group of users, or set of user with a means to enter direct input to a notification system by utilizing mobile devices in any fashion to affect that notification system, or the notifications of that notification system as presented on a computer display means whether private or public.

Further, it would be advantageous to store, event by event or network event by network event, or set by set of real world events or network events, a snapshot 77, system snapshot 79, or heuristic snapshot 77881, as indexed by, using one or more of the following, alone, or in set, combination, or permutation: 1) specific event, 2) event type, 3) event intensity, 4) event urgency, 6) event class, 6) user, 7) user type, 8) user training level, 9) user rank, 10) user age, 11) user sex, 12) user class 13) specific notification, 14) specific notification type, 15) notification level, 16) notification means, 17) event patterns, 18) location, 19) time) 20) a snapshot 77 comprising any or all pertinent system events and immediately perceivable real world events, 21) one or more of these, alone, or in set, combination, or permutation.

and as recorded at the time of each user response, and/or at the time of each real world event, a direct user evaluation inputted in a quantitative or qualitative rating of the performance of the decisions support system 91 or of the decision support system notification type processor 92, or of the overall mission efficacy 93, pertaining to the real world efficacy of the one or more action options, in a storage means, represented by a data tree, or portion thereof, a matrix, a sequence, a pattern, a container with meta data, or other, comprising one or more of the following, alone, or in set, combination, or permutation: 1) response time to select an action, 2) response time to select an action per type of event, 3) response time to reject all actions, 4) response time to select an alternate set of actions, 5) response time to select an action from an alternate set, 6) the decision support system event generated by the decision support system, 7) the notification content, type, and means, 8) the action option event or events sent to the display means, 9) the action option chosen by the user, 10) the alternate action open chosen by the user, 11) a user selected specific concurrence or rating 92 of one or more action options or action option types, 12) a user selected specific concurrence or rating 91 of one or more notifications or notification types, 13) the rejection of all action options by the user, 14) the recording by the system of the failure by a user to respond after a set duration of time 15) the recording by the system of the time for the user to make a response, 16) an action taken outside the system 88 herein described, 17) a user selected specific concurrence or rating of overall mission efficacy 93, 18) a snapshot 77 comprising all pertinent system events and immediately perceivable real world events, including one or more of these, alone or in set, combination or permutation of this paragraph at the time of each user response, and/or at the time of each real world event, and/or any pattern of any set or combination of the foregoing, and/or any repetition or pattern of repetition of any set or combination of the foregoing.

Further, there is a need to incorporate within a storage means a means to store individually, each as a snapshot containerized in a logical container with meta data, each event, sensed event, or inputted event, each computer system event, each logically completed, induced, inferred, deducted, or inducted process, sub-process, or super-process, each occasion of each action option or options offered, each occasion of the selection of each option action, and/or each occasion of each notification including its identified content, its type, and/or its means, through such logical, mathematical, and/or software-based methodology, including but not limited to logical containers with associated meta data, as will enable such processes to be referenced, incorporated and utilized in a decision support system, notification generation system, or learning system comprising a decision support system and a notification generation system.

It would be advantageous to implement a data model suited to rapid retrieval of permuted sets, whether in lists, trees, tables, containers with other meta data, or other means of establishing an addressable pattern or historical occurrence of process or sequence for unique real world events and system events.

It would be advantageous to utilize by mathematical means or other means in a notification generation system to generate a decision support system event notification, notification content, notification type, or notification means It would be advantageous to utilize by mathematical means or other means in conjunction with rules-based systems in a decision support system in order to generate a decision support system event, including an action option, and/or an alternate action.

It would be advantageous to utilize by mathematical means or other means in conjunction with a rules-based systems in a notification generation system in order to generate a notification.

It would be advantageous to encapsulate processes, events, snapshots, action options, notifications and evaluations with logical containers and meta data such that they might maintain a unique identity and a history, and maintain communication ability with other processes, containers, users, or hardware-software intelligences.

It would be advantageous to provide a means for a user to hold and make available to external systems through a mobile device desires and preferences for acceptable advertising and offers according to, separately or in any combination, 1) a time period and/or radius of distance, 2) the type of system that may access it, whether controlled by a password, key, definition, or other, of an inquiring system, 3) one of the set-by-user states of a) broadcast data openly for any system to hear 165, b) allow data to pass to all inquiring systems, c) allow a system to submit an approval request for approval by the user, or d) do not allow data to pass to inquiring systems, 4) any of the preceding according to a list of acceptable inquiring systems, 5) any of the preceding in (3) according to a window of time and/or radius of distance, 6) any of the preceding in according to the recognition of shared presence or presence not shared.

It would be advantageous, therefore, to differentiate, for either or both, the category or division of the information source or of the result vector of a response option selection, by a notification type, such as color, shape, three-dimensional object, symbol, icon, or number, or other, or a notification means, such as a synthesized voice communication or haptic shaking, or both, or other, the category or division of the source of at least one information element, and/or the category or division of the consequential result vector of at least one response option comprising a hardware-software notification system or display means.

Web and mobile web operations are generally achieved with containerization through XML, JAVA, JSON, java script, or an object-oriented framework including meta data, and a preferred embodiment generally following the principles of same is here described; however other programming frameworks might also be used to achieve the implementation of this invention.

SUMMARY OF THE INVENTION

The embodiments provided herein have utility in the area of decisions support and notification systems, and in mobile device related advertisement and engagement platforms. The embodiments provided herein also have utility in the area of stored dialogue based communications between buyers on one side and sellers, advertisers, and promoters on the other side. The embodiments provided herein also have utility in the area of distinct iconic representations as distinct components of advertisements or offers that indicate an opportunity to fulfill an offer transaction, whether past, present, or future, such as buy-local-now, navigate-to-buy, navigate-to-pick-up, navigate-to-fulfill, navigate to transact, navigate-to-complete, drive-to-buy, walk-to-buy, or be-transported to buy (taxi) functionality attached to associated with buttons advertisements, promotions, offers, representations, indications, or notifications for drivers and passengers in automobiles, other vehicles, and public transportation, and for pedestrians, in commercial buildings, airports, movie theaters, public arenas, and shopping malls and districts, including but not limited to location services, itineraries, concierge services, and functionality and interaction therewith. The embodiments herein also have utility in the area of rapid intelligent sense-and-respond operations while maintaining situational awareness and initiating responsive actions for civilian engagement, including but not limited to group cooperation, learning, or competition. The embodiments herein also have utility in the area of the effective cyclic interaction and improvement of decision support systems, notification generation systems, telematic systems, and robotic systems through interaction with users.

The embodiments provided herein further have utility in a hardware-software system in the area of market efficiencies through hardware-software network mediated dialogue concerning pricing, offers and discounts between consumers and advertisers, or between consumers and merchants offering goods or services. The embodiments provided herein further have utility in a hardware-software system in the area of establishing a mobile-device mediated dialogue between consumers, merchants and advertisers.

The embodiments provided herein have utility in a hardware-software system in the area of the communication to a user, through a notification type and means, of the category or division of the information source to which the user is responding, and/or the category or division of the field of action of the consequential result of a selected response option, or the fact of the existence of a real-world response result vector.

DESCRIPTION OF THE INVENTION

Figure 1:
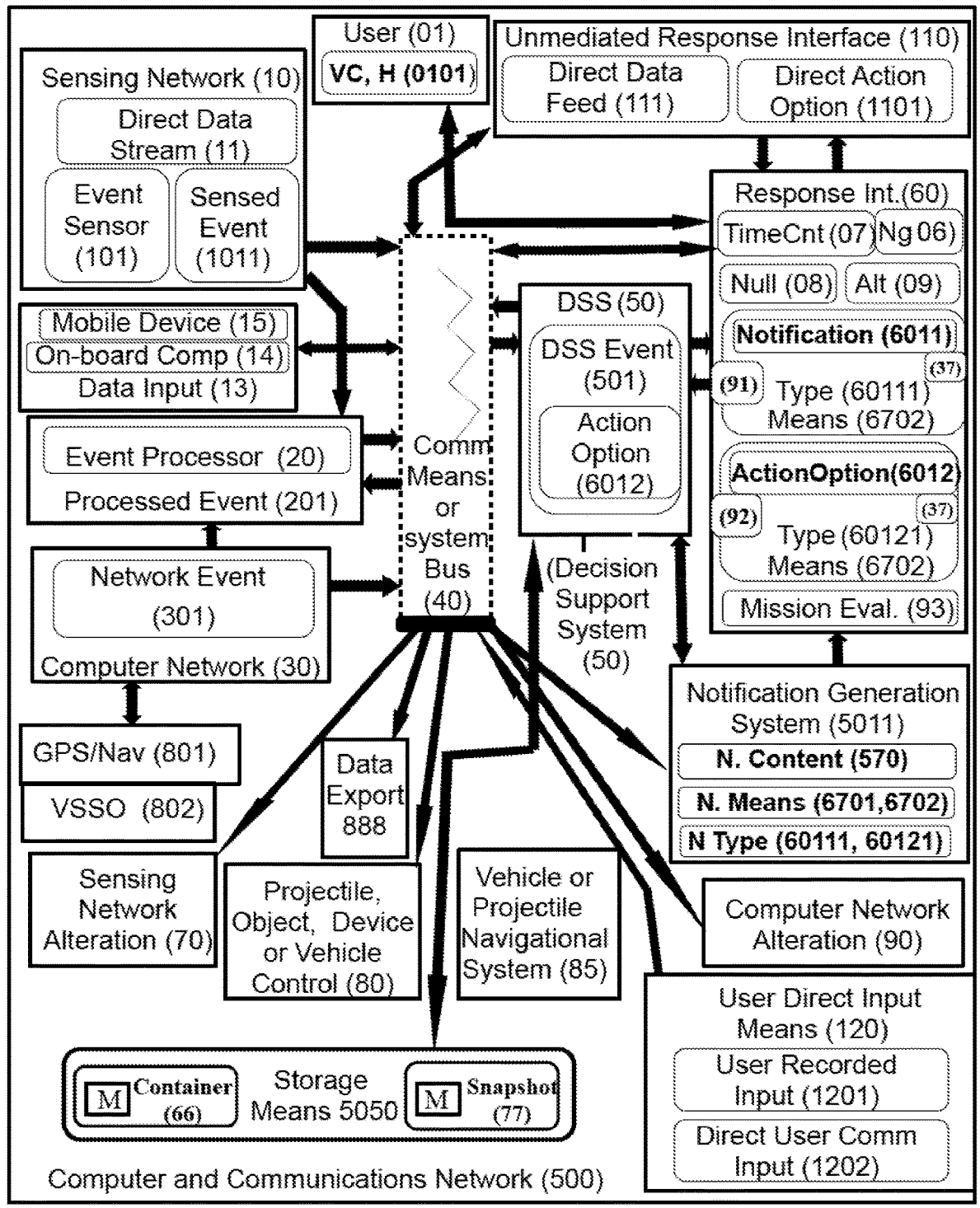
FIG. 1 depicts a computer and communications network utilizing a sensing network to send sensed events to a sensed event processor, a decision support system, and a notification generation system, in order to present a user with responsive action options presented through and with a notification comprising content, type and means in order to affect actions in the world, or alter a computer system, a decision support system, a notification generation system, an advertising display network, or control a projectile, device, object vehicle, robot, or robotic component, or interact with a vehicular or projectile navigational guidance system

In the preferred embodiment, the present invention involves a system and method to generate a recognition-primed notification and responsive situational awareness system in an advertising display network or telematic system including actionable intelligence arising from the interaction of users with machine-based intelligence, and is here described. The system and method comprises one or more of the following operating alone, or in set, combination, or permutation: 1) a sensing network 10 serving as a data input source as an event sensor 101 captures an event 1011, including voice, touch, gesture, haptic recognition, or any other means of sensing an event, or receives an internal system event including, but not limited to, a heuristic system 99991 event, or a snapshot event 77, 79, 77881, or another means of receiving input, 2) a data input source application program interface 111 or mobile device 15 that might provide data to event processing 20 from a data source external to the system herein described, 3) a sensed event processing system 20 adding data or meta data to a sensed event 1011, 4) a communication means 40, 5) a software-based decision support system 50 generating a decision support system event including one or more action options 6012, and meta data (M, A W, X, Y, Z . . . ) as illustrated further in the Figures intended to assist a notification generation system 5011 in formulating a notification 6011, 6) a notification generation system 5011 generating a notification 6011 with content 570 expressed within or by a notification type 60111 delivered through a notification means 6701 to a user 01 engaged with or observing a response interface or computer display means 60, and a notification 60121 encapsulating action options 6012 within or by a notification type 60111 and delivered through a notification means 6701, 7) a data export means 888 alternately with an application program interface, 8) a data input/import means 13 alternately with an application program interface, including mobile devices 15, on-board vehicular computer 14, 9) a notification means 6701, 10) a response interface or computer display means 60, 11) a communication means 6701, 6702 enabling the system to communicating notifications and action options to users 01 thorough the system or communication means 40 including a means a) for a user to directly reject as a negative 06 one or more, or all, action options presented, b) for the computer system to report a null 08 if there is no response from the user after a designated time period, per event, or set of events, c) for the user to view and select alternative action options 09 not initially presented as optimal, or secondary responses that have not been algorithmically advanced to the front of the queue by the decision support system as the optimal action options, and d) for the system to capture with a time counter 07 the time required for a user to select an action option, 12) a data storage means 5050, including the capability to store patterns, containers with meta data, or snapshots as herein defined, 13) a means for a user to evaluate or rate 92, based upon the efficacy of actions in the real world, virtually all aspects of the system as further described in FIG. 7, Element 3, and its annotation, 14) a means for a user to evaluate or rate 91, the performance of the notification generation system 5011 or a specific notification generated 6011, as further described in FIG. 7, Element 3, and its annotation, 15) a means for a user to evaluate or rate based upon the efficacy of actions in the real world 93 the overall efficacy of a mission, or 16) a means to input and integrate through a direct data feed 111 an action taken responsive to a present time situation or its simulation 1101 external to the system described herein, 17) a hardware-software system capable of enabling the efficient interaction, operation, and effects of the components described, comprising an input device 24, a CPU processor 18, a data storage device 2020, an output device 16, a memory unit 22, a communication device 26, and a data bus 12 and/or communication means 40, with the sum and synergy of all components described in this paragraph (085) working together in order to a) alter a sensing network, b) control a projectile, object, device, robotic motion, or vehicle c) input, control, or interact with a vehicle or projectile navigational system, d) alter a computer network, a decision support system, or a notification generation system, or e) alter a user action response display, 15) a hardware-software system capable of enabling the efficient interaction, operation, and effects of the components described, comprising an input device 24, a CPU processor 18, a data storage device 2020, an output device 16, a memory unit 22, a communication device 26, and a data bus 12 and/or communication means 40.

Figure 2:
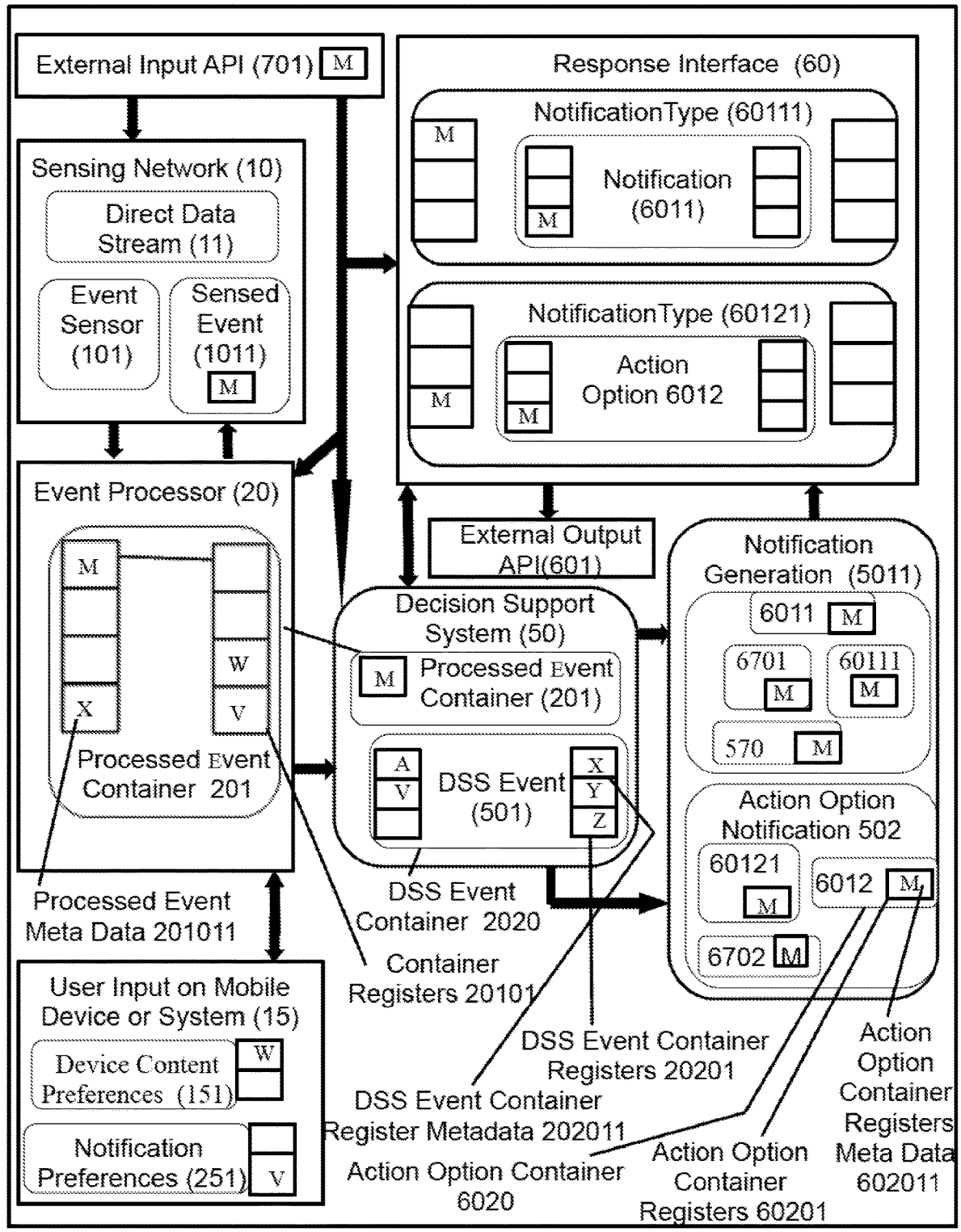
FIG. 2 depicts an event processor containerizing a sensed event with containers and meta data registers in order to further process it through a decision support system and notification generation system creating a particular notification with content of a particular notification type through a particular notification means to effect a notification and an action option through a response interface. The response interface includes a means for a user to enter a direct negative or rejection for one, more, or all action options presented, or for one, more, or all notifications presented, a means whereby a null may be registered by the system in the event of a failure by the user to respond after a set lapse of time, a means for a user to enter alternative action options other than those initially presented, and the means for the system to capture the amount of time it takes a user to respond between the presentation of a notification and the selection of any action option.
Figure 4:
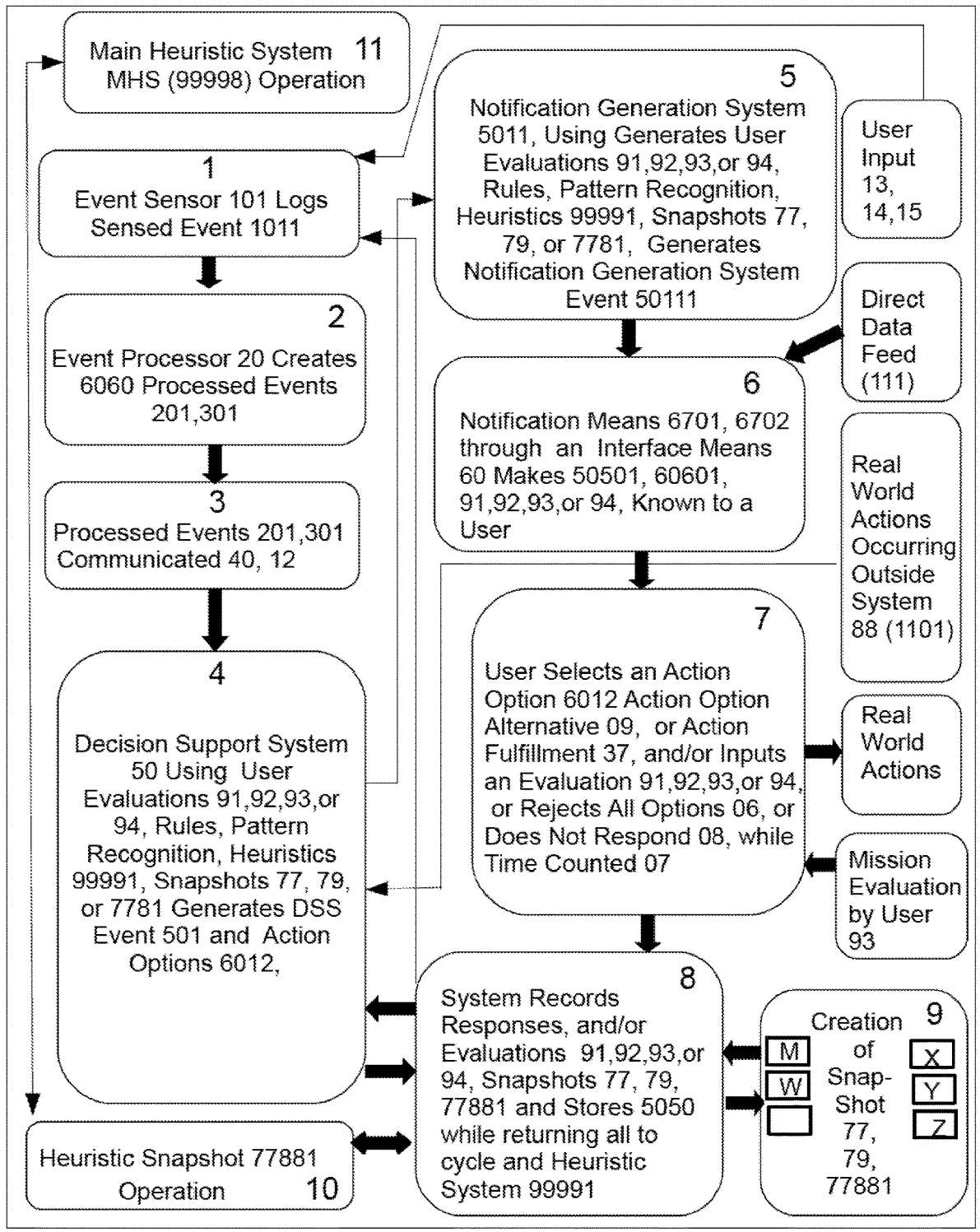
FIG. 4 depicts a general flow chart of the processes of the system including the main heuristic system.

Referring now to FIG. 4 and FIG. 2, on a computer and communications network 500 with a sensing network 10 an 1) event or condition that is sensed 1011 by an event sensor 101, or 2) a network event 301 in a computer network, or 3) a direct action option 1101 made in response to a direct data feed 111 on a response interface 110, or 5) a user sense input 1201 through a user sense input means 120 or 6) a data input means 13 including but not limited to a mobile device 15 or an on-board computer system 14, is sent to an event processing means 20 designed to create a unique mathematical signature for that event utilizing notation for logical containment of that sensed event 1011 including meta data attributes based upon one or more of the following, the time, location, sensing platform, sensing device, type of sensor, recording source, whether a person, a sensing device, unmanned aerial vehicle, on board sensors, external system sensors or a mobile device, recording type, whether, sonar, radar, video, near-field communications, gesture capture, touch, mobile camera or other, place of receiving, whether auto, boat, ship, plane, home, or commercial building, or other, or other basis in order to logically define it and encapsulate it as a container, and to assign to that container using meta data with registers holding values attached to that container a value or notation for each of the preceding thereby generating a processed sensed event 201 with meta data 201011 holding values or attribute in registers 20101.

The processed event 201 is sent to a decision support system 50.

The decision support system 50, in order to deliver, and in order to learn to deliver, the most effective responsive action options 6012 to users 01 compares and analyzes utilizing pattern recognition and rules-based operations, the meta data whether M, A, X, Y, Z, as herein further described in the Figures, of the processed event 201 with the meta data of other containerized defined events, whether historical, or formulated, in order to generate 1) a decision support event 501 with its own meta data M, A, X, Y, Z, as herein further described in the Figures, and in order to, based upon the historically successful, whether in this system or any system, responses to the sensed event 1011, processed event 201, decision support event 501, snapshot 77, system snapshot 79, or heuristic system snapshot 77881, or based upon designed responses to any of the preceding, and 2) tone or more action options 6012.

A snapshot means any recorded pattern, or mathematically recorded pattern, that can be stored and accessed, recording pattern of events, decision support events 501, action option system events 60601 in one, more, or all of its elements, notification generation system events 50501, in one, more, or all of its elements, snapshots 77, system snapshots 79, heuristic snapshots 77881, user evaluations 91, 92, 93, 94, or other pertinent events in the system herein described at defining moments within its operations, or over a predetermined time, sequence of events, or set of events, including but not limited to the span of time from the sensing of a real world event to the selection of an action option and/or its execution or the span of time between an action option system events 60601 in one, more, or all of its elements, or notification generation system events 50501, in one, more, or all of its elements, and a user response or evaluation 91, 92, 93, 94.

A heuristic snapshot means a snapshot generated by the interpolation or evolution of a pattern or sequence of snapshots over a given duration of time, or locale, by means of a decision support system.

The decision support event 501 with its own meta data whether M, A, X, Y, Z, as herein further described in the Figures, once generated, is sent to a notification generation system 5011 for additional processing.

Referring now to FIG. 2, in the preferred embodiment, the notification generation system 5011, in order to deliver, and in order to learn to deliver, the most effective notification generation system event 50501, being notification content 570, notification means 6071, notification type 6011, and/or notification fulfillment offer 37, responsive to sensed events 1011, processed events 201, decision support events 501 or inputted events 13 to users 01, and the most effective action option system events 60601, compares and analyzes, by mathematical means according to rules as herein described to achieve the optimum cycle result 3344 as herein described, utilizing the comparison of 1) the meta data (M, A, W, X, Y, Z . . . ), whether historical, inputted, captured, or formulated by the system described herein, as herein further described in the Figures, of the decision support event 501, or with the meta data of other decision support system events 501, action option system events 60601, and notification generation system events 50501, as available in snapshots 77, system snapshots 79, and heuristic system snapshots 77881 available through the storage means, whether in memory, live memory, or pre-cached within the system.

The presentation on a response interface or computer display means 60 of a notification generation system event 50501 and/or an action option system event 60601, enables the meta data of containerized sub-elements to be a) quantitatively evaluated or rated 91, 92 for its effectiveness in capturing the user attention, or clearing communicating the content 570, including its nature, importance, and urgency, or effecting a rapid response, or in personalizing the notification, or in achieving a result in the real world, or each, any or all, or b) to be assigned a value because it has rejected by the user 06, or c) to be assigned a value because it failed to generate a response 08 from the user, or d) to be assigned a value because it elicited an alternative 09 response from the user, e) to be assigned a value by the action of a time counter 07 tracking the time of response between a notification appearing and a user responding, or e) to be assigned a value because it has been quantitatively rated by the user 01 or by the system for overall mission effectiveness 93 in achieving a satisfactory cycle result 3344.

The operations of the decision support system 50 and the notification generation system 5011 are further cyclically enhanced through the operations of the main heuristic system 99991 utilizing the meta data of containerized defined notifications assembled by the system by the processes described herein, in order to, based upon the historically successful, whether in this system or any system, responses to the sensed event 1011, processed event 201, decision support event 501, snapshot 77, system snapshot 79, or heuristic system snapshot 77881, or based upon designed responses to any of the preceding, thereby more effectively generate an action option system event 60601, and or a notification generation system event 50501, the two acting on the response interface as one or in addition, association, encapsulation of, inclusion within, the other.

A notification 6011 is notification content 570, a notification type 60111, and notification means 6701, and action options 6012 associated with, included with, or encapsulated by, a notification type 60121, made known through a notification means 6702.

Notification content 570 means any form of any digital content whether audio, photo, video, text, or other.

Notification type 60111 means a classification, such as general, advisory, warning, alert, or emergency, or any similar classification of notice, meant to be associated with certain forms of notice, such as gray for general, yellow for advisory, orange for warning, flashing red for alert, flashing red and intermittent buzzing for emergency.

Notification means 6701 means the technological means of delivering a notice, such as a display screen, a mobile device, a public display screen, a loudspeaker, a graphical user interface, an audio voice or vibration, a haptic vibration.

Inbound notification means a notification received by a user 01 or a user's mobile device 15, on-board computer 14, or a public display screen in the near vicinity or soliciting radius of a user, and in the preferred embodiment, preferably based upon stored, stated or interpreted preferences of the user.

The notification 6011, comprising content 570, type 60111, and means 6701, and the encapsulated action options 6012 become known to a user 01 through a response interface means or computer display means 60.

An action option 6012 or evaluation 91, 92, 93, 94 might be selected through the response interface or computer display means 60 by a touch on a computer screen, a keyboard or mouse click, a voice command, a haptic means, wave means, a gesture means, a mobile device means, input means or other.

The duration of time between the posting of an action option 6012, and a) a selection of that option, b) an alternate action option 09, c) the posting of a null 08 indicating no action option has been selected after a set period of time, d) the rejection of an option 06, or e) the entering of an evaluation 91, 92, 93, 94 is counted and recorded by a time counter 07 and integrated into all snapshots as herein described.

An action option representing one or more of the action options not selected by the decision support system 09 to present to the user, either the next most favorable, or selected by at least one rule for alternates, is provided to the user as an alternate selection 09, whether immediately visible or able to be made visible by user choice, case by case, or toggled on or off.

A user 01 is a human, a mammal, a robot, a biological intelligence, a cybernetic organism, a human-robotic hybrid or human-sense-processor hybrid, or any class, set, or group of the foregoing, or a software-based intelligence utilizing rules or heuristic operations embedded in, or operating within, any of these 0101, or any of these in combination with computer-based robotic, telematic or haptic controls interacting with the system described herein, or any other system where a user is making a choice to act in the world through a hardware-software system when that hardware-software system is interfaced to the system described herein.

A sensing network 10 means any means of notating, recording, logging or communicating a) any change in the real world that would otherwise be beyond the effective range of the human senses of those users interested in observing that real world, b) any event sensed by the human senses directly, c) any event captured by a user utilizing any technological means and submitted to a computer network, d) any event captured by any technological means and submitted to a computer network, e) the recognition, capture, or communication by a computer network of any user gesture, including but not limited to the duration, form, speed, angle, tilt, rotation, shape, type, three dimensional x-y-z axis movement through space, time, location, and/or response time of any distinct recognizable component of the user's body or senses, or f) the recognition, capture, or communication by a computer network of any user generated touch, sound, movement, gesture, haptic event, or voice expression, g) any interaction with another computer system or network providing time or location information, h) any change in time, I) any change in location.

The sensing network 10 can be based on a manned vehicle, including but not limited to ships and aircraft, an unmanned vehicle, in water, air, or space, on an orbiting space station or vehicle, satellite, subspace vehicle, or on a permanent fixture, floating on, or submersed in water, in the air tethered to the ground, building or tower, standing on the ground, attached to or sitting on a building or tower, in orbit on a satellite or space station, or orbiting vehicle, or on the moon, or a planet in the solar system, on an autonomous robot in any time or space, in one or more mobile devices, one or more on-board vehicular computers, one or more public display systems, or any of the foregoing in combination.

A sensed event 1011 means any event, occurrence, condition, change, movement, location, locale, time, or passage of time occurring in the real world in present time represented, logged, or communicated in any digital form, or in a form that can be communicated from one location to another location, from one device to another device, or from one computer system to another computer system.

A sensed event 1011 also means any defined event, or occurrence that might be captured by an event sensor 101, being any technological means, or by the senses of a user, naturally, or technically enhanced or reproduced, including but not limited to a range of change, a movement, the passage of time, a value, a level, an intensity level, a shape, a sound, electromagnetic activity, a change in density, pressure, or humidity, radioactivity, light level, contrast level, shadow level, color, a sonar or radio event, the capture, logging, or noting of any ray, particle, or wave phenomenon as understood in physics, indication of a geofence crossing, indication of a time fence crossing, a change of mass, a change of time, a change of magnetic level, a change of heat or temperature, a change of radioactive level, a voice, a touch, a gesture, a movement, a haptic contact, or other.

A network event 301 is any event, occurrence, condition, or change occurring in a computer network 30 or software-based processing system.

An event sensor 101 means any means, device, hardware, or software capable of detecting a sensed event 1011, including but not limited to, radio, cellular, radar sonar, electromagnetic, thermal, pressure, visual, visual detection, auditory, magnetic wave-based, electrical wave-based, radioactivity detection, voice, gesture, touch, haptic means, or other.

A processed event 201 means a sensed event 1011 combined with one or more of the following: 1) a time, 2) a location, 3) an event type, 4) an event intensity level, 5) a delta intensity level, 6) a detection type, 7) a detection certainty level, or 8) an association with a predefined event, 9) a human danger level 10) a threat level, 11) an environment danger, 12) an asset threat level, 13) any predefined event associated with a delta of change, 14) any event that can be qualitatively rated, and 15) any event that can be classified as a type.

A container 44 means an interactive nestable logical domain configurable as both subset and superset, including a minimum set of attributes coded into dynamic interactive evolving registers, containing any information component, digital code, file, search string, set, database, network, event or process, and maintaining a unique network-wide lifelong identity.

Figure 3:
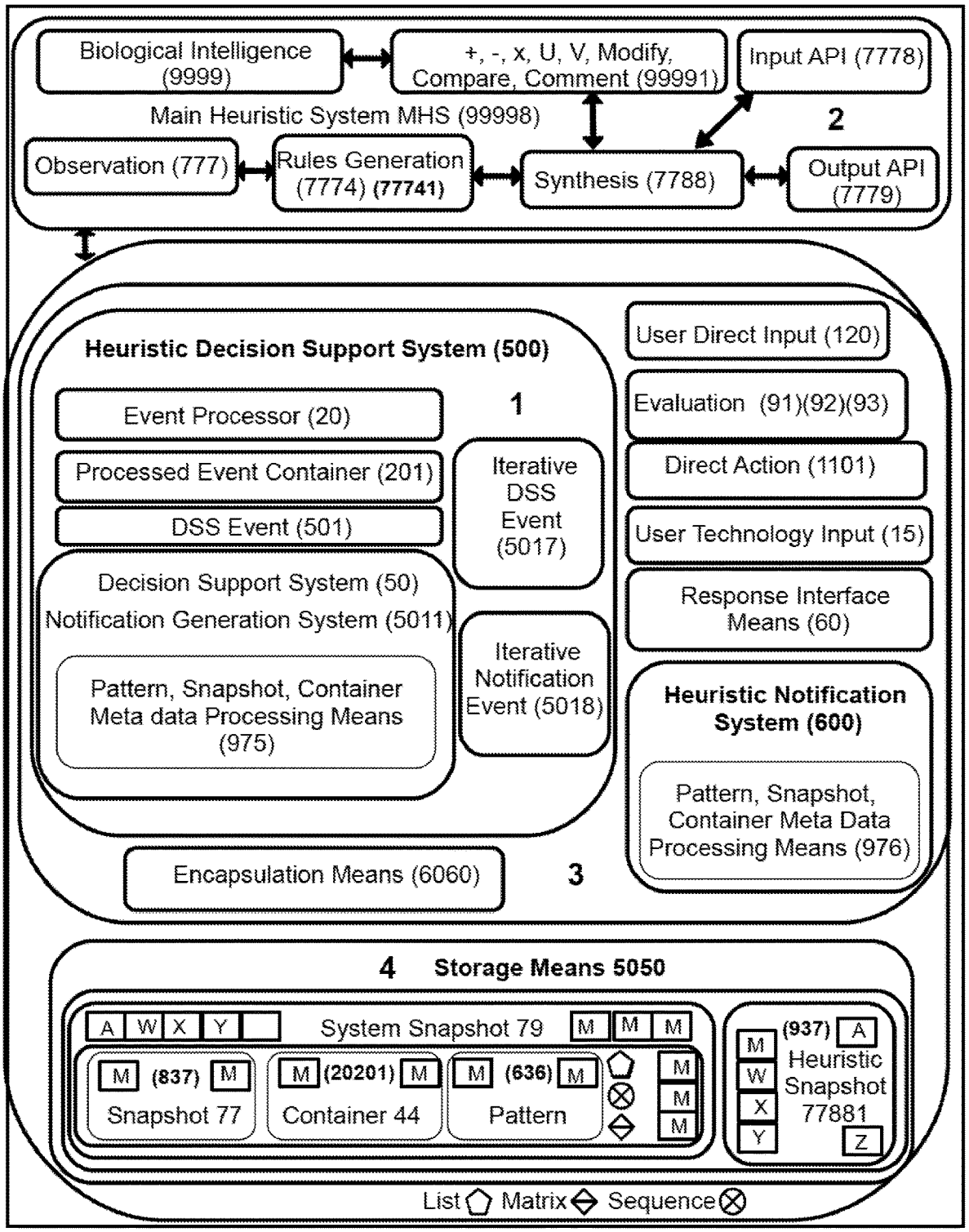
FIG. 3 depicts interaction of the decision support system, decisions support system event type processor, storage means, and response interface means including notifications and notification types, action options and action option types including their evaluation by a user, a mission evaluation by a user, including interaction of same with a storage means, encapsulation means and a main heuristic learning system, including snapshots, heuristic snapshots, and meta data.

Referring now to FIG. 3, Meta data (M, A, W, X, Y, Z . . . ) comprises, all or in part, user created, system created, heuristic system created qualifying or conditional or value-based attributes to be associated with any unique sensed events, processed event, decisions support system event, notification generation system event, action option, response interface event, computer display event, snapshot event, system snapshot event, heuristic snapshot event, heuristic operation event, or any unique or discernible component, element, or process of the system described herein.

A pattern 636 is any means of capturing in software, whether mathematical or other, of identifying sequences, similarities, or correspondences, repetitions, sets, or derivative sets based upon meta data or attributes of any unique occurrence, within, including but not limited to, time and space.

Pattern meta data 737 means attributes or data descriptors associated with all or part of a pattern.

A matrix is a logical set of rows and columns in two dimensions, three dimensions, four dimensions, or n dimensions, through, including but not limited to, time and space.

Matrix meta data 837 means attributes or data descriptors associated with all or part of a matrix.

Heuristic meta data 937 means meta data evolving with and the through the life of the system described herein as utilized in heuristic snapshots 77881, and the main heuristic system 99998.

A system snapshot 79 is any set, class, pattern, or collection of snapshots 77, as collected through time or space.

A heuristic system snapshot 77881 is a snapshot derived by the operations and rules of the decision support system and the notification generation system interacting with users, all interacting with the main heuristic system 99998.

Mathematical operations 99991 means that class, set, or subset of mathematical operations, including but not limited to basic calculations, parsing, searching pattern recognition, set-theoretic operations, symbolic operations, or operations of algebraic topology, as utilized to enable the generation of action option system events 60601, notification generation system events 50501, or heuristic system 99991 events.

Observation 777 means the operations of a software-based independent observation platform internal to the system monitoring and recording the interaction of users, including but not limited to user evaluation 91,92,93, of any or all aspects of the decision support system 50, or notification generation system 5011, the election of action options 6012, of alternate action options 09, of rejections of action options or notifications or its components 06, of the length of time of a user response 07, or of the failure of the user to respond (null) 08, representing an alternate view, perspective, or set of operations different than the storage means 5050.

Rules generation 7774 means the alteration, modification, addition, subtraction or formulation of rules 77741 based upon the operation of the main heuristic system 99881.

Synthesis means 7788 means the combining of internal system processing input with input received or gathered from external processing systems by the user of ordering, filtering, or conditional mathematical operations on input meta data M.

Input API 7778 means the defined allowable interactions with computer networks or systems external to the system described herein.

A cycle result 3344 is the effective result as evaluated by user in user evaluations as described herein or as calculated by a system rule based upon the sensing of addition events 1011 or user data input 13 achieved in the real world or within the system described herein by the selection of one or more action options 6012 or alternate action options 09 for the cycle 33441 operating between the time an event is sensed 1011 and the time a selected action option 6012 takes effect.

Presentation or presents means making some or all of the elements of a notification generation system event 50501 and/or an action option system event 60601 known to a user 01.

In the preferred embodiment, the main heuristic system 99998 through the continuous or continual processing of all available meta data M, A, W, X, Y, Z . . . available within the main heuristic system, additionally including meta data from the input API 7778, as received from the synthesis means, utilizing mathematical operations 9991 governed by rules 77741, operates, utilizing, including but not limited to comparison, induction, or deduction, partially including historical observations of the observation means 777 and the storage means 5050 in relation to the historically optimally effective cycle result 3344, to generate, or assist the decision support system 50 or the notification generation system 5011 in generating, those decision support events, notification generation events, alternate notification generation events, heuristic system events, action options, and alternative action options most effectively responsive to sensed events 1011, user input, and external system input as defined and suggested by the rules of the system described herein.

A notification generation system event 50501 means a notification 6011, including notification content 570, notification type 60111, and notifications means 6701, and for action options 6012, an action option notification type 60121 and an action option notification means 6702.

An action option event or action option system event 60601 means a notification containing an option 6012, an action type 60121, a fulfillment offer 37, and/or an action option means 6702.

Output API 7779 means the interactions with computer networks or systems external to the system described herein.

A data storage means 5050 means a storage means capable of recording and holding digital data in the form of lists, tables, trees, patterns, neural nets, containers, or other means.

In the preferred embodiment, data is stored in the data storage means 5050 or in live memory, or anywhere in the system, such that the decision support system 50, and/or the notification generation system 5011, and/or the main heuristic system 99991 might by mathematical means generate the best action option system event 60601 or notification generation system event 50501, using one or more of the following, alone, or in set, combination, or permutation: 1) specific event, 2) event type, 3) event intensity, 4) event urgency, 6) event class, 6) user, 7) user type, 8) user training level, 9) user rank, 10) user age, 11) user sex, 12) user class 13) specific notification, 14) specific notification type, 15) notification level, 16) notification means, 17) event patterns, 18) location, 19) time) 20) a snapshot 77, 21) a system snapshot 79, or a heuristic snapshot 77881, including any of these, using one or more, alone, or in set, combination, or permutation, alone or in combination, at the time each event occurs, each user response is generated, or each cycle achieves its result 3344.

In the preferred embodiment, the user 01 is provided on a response interface 60 with a means to input a quantitative or qualitative rating per cycle 33441 of the performance of the decisions support system 91, of the notification generation system 92, of the overall mission efficacy 93, of the main heuristic system 99991, or of the cycle result 3344.

Referring now to FIG. 2, in a preferred embodiment each sensing event 101, network event 301, user input means 15 including device content preferences 151 and notification preferences 251, or direct action option 1101 is encapsulated by an encapsulation means 6060 in a single uniquely identified logical container with registers 20101 containing processed event meta data 201011 M, A, W, X, Y, Z . . . by an event processor 20 including but not limited to location, time, type, intensity level, urgency level, human threat level, human safety level, human danger level, environmental threat level, asset threat level, and recognition certainty level to create a processed event 201 with associated meta data.

That processed event 201 with associated meta data is sent through the communication means 40 or an internal data bus 12 to a recognition-primed rules-based decision support system 50 that utilizes mathematical operations including, but not limited to, correspondences, associations, rules-based systems, or pattern recognition to generate a decision support system event 501 and one or more action options 6012.

In the preferred embodiment, the decision support system 50 utilizes mathematical operations on meta data governed by rules-based systems to process and analyze, correspondences, associations, patterns by utilizing, including but not limited to comparison, induction, or deduction, partially including historical observations of the observation means 777 and the storage means 5050 in relation to the historically optimally effective cycle result 3344, with support, checking by, computational, mathematical or rules-based integration with, the main heuristic system 99991 to generate the most effective decision support system event 501 and one or more action options 6012, and with those mathematical operations on meta data further generating the most effective decision support system event 501 and action options 6012 by assigning to the processed event container 201 meta data values, using one or more of the following, alone, or in set, combination, or permutation: 1) specific event, 2) event type, 3) event intensity, 4) event urgency, 6) event class, 6) user, 7) user type, 8) user training level, 9) user rank, 10) user age, 11) user sex, 12) user class 13) specific notification, 14) specific notification type, 15) notification level, 16) notification means, 17) event patterns, 18) location, 19) time) 20) a snapshot 77 comprising any or all pertinent system events and immediately perceivable real world events, including one or more of these, alone, or in set, combination, or permutation: or in combination, at the time each action is generated, and/or at the time of each real world event, 21) direct user evaluations 91, 92, 93, 94 inputted in a quantitative or qualitative rating of the performance of the system as herein described as related to related sensed events 1011 or related processed events 201.

The decision support system event 501 is sent to a notification generation system 5011 that utilizes mathematical operations on meta data governed by rules-based systems to process and analyze, correspondences, associations, patterns by utilizing, including but not limited to comparison, induction, or deduction, partially including historical observations of the observation means 777 and the storage means 5050 in relation to the historically optimally effective cycle result 3344, with support, checking by, computational, mathematical or rules-based integration with, the main heuristic system 99991 to generate the most effective notification generation system event 50501 and action option system event 60601, and with those mathematical operations on meta data further generating the most effective notification generation system event 50501 and action option system event 60601 by assigning to that decisions support event container meta data values, utilizing one or more of the following, alone, or in set, combination, or permutation: 1) specific event, 2) event type, 3) event intensity, 4) event urgency, 6) event class, 6) user, 7) user type, 8) user training level, 9) user rank, 10) user age, 11) user sex, 12) user class 13) specific notification, 14) specific notification type, 15) notification level, 16) notification means, 17) event patterns, 18) location, 19) time) or 20) a snapshot 77 comprising any or all pertinent system events and immediately perceivable real world events, 21) one or more of these working alone or in combination, at the time each action is generated, and/or at the time of each real world event, 20) direct user evaluations 91, 92, 93, 94 inputted in a quantitative or qualitative rating of the performance of the system as herein described as related to related decisions support events 501, notification generation system events 50501, and/or action option system event 60601.

In the preferred embodiment, the decision support system 50 by mathematical means generates the most effective decision support event 501 including at least one action option 6012 utilizing one or more of the following, alone, or in set, combination, or permutation: 1) specific event, 2) event type, 3) event intensity, 4) event urgency, 5) event class, 6) user, 7) user type, 8) user training level, 9) user rank, 10) user age, 11) user sex, 12) user class 13) specific notification, 14) specific notification type, 15) notification level, 16) notification means, 17) event patterns, 18) location, 19) time) 20) a snapshot 77 comprising any or all pertinent system events and immediately perceivable real world events, including any of these, alone, or in set, combination, or permutation, at the time each action is generated, and/or at the time of each real world event, 20) a direct user evaluation inputted in a quantitative or qualitative rating of the performance of the decisions support system 91 or the decision support system notification type processor 92 or the heuristic system 99991, or overall mission efficacy 93 pertaining to the real world efficacy of any of the elements of a notification generation system event 50501 and/or action option system event 60601, represented by a data tree, or portion thereof, a matrix, a sequence, a pattern, a container with meta data, or other expeditious means, using one or more of the following, alone, or in set, combination, or permutation: 1) response time to select an action, 2) response time to select an action per type of event, 3) response time to reject all actions, 4) response time to select an alternate set of actions, 5) response time to select an action from an alternate set, 6) the decision support system event generated by the decision support system, 7) the decision support system event notification type, 8) the action option event or events sent to the display means, 9) the action option chosen by the user, 10) the alternate action open chosen by the user, 11) a user selected specific concurrence with, or rating of, 92 one or more action options or action option types, 12) a user selected specific concurrence, or rating of 91 one or more notifications or notification types 13) a user selected specific concurrence, or rating of, 93 overall mission efficacy, 14) the rejection of all action options, 15) the failure to respond, 16) the time for the user to make a response or failure to respond, 17) an action taken outside the system 93 herein described, 18) a snapshot 77 comprising all pertinent system events and immediately perceivable real world events, including any of these, alone or in combination, at the time of each user response, and/or at the time of each real world event, and 19) any pattern of any set or combination of the foregoing, or any repetition or pattern of repetition of any set or combination of the foregoing.

In a preferred embodiment, the notification generation system 5011 by mathematical means generates the most effective notification generation system event 50501 and/or action option system event 60601 using one or more of the following, alone, or in set, combination, or permutation: 1)) specific event, 2) event type, 3) event intensity, 4) event urgency, 6) event class, 6) user, 7) user type, 8) user training level, 9) user rank, 10) user age, 11) user sex, 12) user class 13) specific notification, 14) specific notification type, 15) notification level, 16) notification means, 17) event patterns, 18) location, 19) time) 20) a snapshot 77 comprising any or all pertinent system events and immediately perceivable real world events, including any of these, alone or in combination, at the time each action is generated, and/or at the time of each real world event, 21) a direct user evaluation inputted in a quantitative or qualitative rating of the performance of the decisions support system 91, or the decision support system notification type processor 92, or the overall mission efficacy 93 pertaining to the real world efficacy of the one or more action options, or the performance of the heuristic system 99991, by using response sets by a data tree, or portion thereof, a matrix, a sequence, a pattern, a container with meta data, or other expeditious means, using one or more of the following, alone, or in set, combination, or permutation: 1) response time to select an action, 2) response time to select an action per type of event, 3) response time to reject all actions, 4) response time to select an alternate set of actions, 5) response time to select an action from an alternate set, 6) the decision support system event generated by the decision support system, 7) the decision support system event notification type, 8) the action option event or events sent to the display means, 9) the action option chosen by the user, 10) the alternate action open chosen by the user, 11) a user selected specific concurrence with or rating of 92 one or more action options or action option types, 12) a user selected specific concurrence with or rating of 91 one or more notifications or notification types) a user selected specific concurrence with or rating of the overall mission efficacy 93, the rejection of all action options,) the failure to respond, 16) the time for the user to make a response or failure to respond, 17) an action taken outside the system 93 herein described, 18) a snapshot 77 comprising all pertinent system events and immediately perceivable real world events, including any of these, alone or in combination, at the time of each user response, and/or at the time of each real world event, and 19) any pattern of any set or combination of the foregoing, or any repetition or pattern of repetition of any set or combination of the foregoing.

The notification generation system event 50501 is made known to the user 01 through a response interface or computer display means 60 by a notification means, 6071, 6072, whether visual, auditory, gesture, wave phenomenon, or haptic interaction, with that response interface offering the user the opportunity to effect one or more actions in the world 6011 in order to alter 92 a sensing network 10, initiate or control an object or device 80, affect a vehicular navigation system 85, alter a computer network 90, alter a recognition-primed rules-based decision support system 50, alter a notification generation system 5011, or alter the heuristic system 99991, and may include, appearing alongside notifications 6011 and action options 6012, a live video or audio feed or other with associated with direct action options 1101, neither of which have been processed through the decision support system, such as a launch missile option in response to a relayed live video feed.

A decision support event 501 means the logical result of the processing of a rules-based system to produce one or more action options responsive to sensed, processed or inputted events with meta data to assist a notification generation system in generating a notification generation system event 50501 and/or action option system event 60601.

A network event 301 means any event, occurrence, condition, or change occurring in a computer network 30 or hardware-software-system.

A rating of mission efficacy 93 means a user's or users' quantitative or qualitative rating of the results of action options selected through the system herein described.

A register means a meta-data item indicating a value, a type, a set or class indication, a time, a location, a human response factor, a human threat level, a danger level, or any other value-related data pertaining to a sensed event 1011, processed event 201, decision support system event 501, notification generation system event 50501, action option system event 60601, observational event 777, any heuristic system event create by, operating through in association with, the main heuristic system 99991, or any storage means event 5050, including but not limited to the creation of snapshots 77, a system snapshot 79, or heuristic snapshots 77881.

An event processor or sensed event processor 20 means a software-or-hardware-based processing system capable of capturing or creating a sensed, inputted, or received event.

A communication means 40 means radar, sonar, fiber optic, light, microwave, radio wave, infrared, magnetic, computer circuit, application program interface, physical delivery, or an internal system bus 12 in a computer, or any means of communicating a sensed event, a processed event, a network event, or any other operation, content, result, rule or component of this system from one location to another location, from one device to another device, or one computer system to another computer system.

A notification 6011 means notification content 592 with a notification type 60111, 60121 arising on an interface or digital display means 60 through a notification means 6921, 6922 in response to, as those events or inputs are processed through the system described herein, 1) a sensed event 1011, 2) a processed event 201, 3) a direct option action 1101, 4) a user sense input 1201 from a user source input means 120, 5) a data input 13, 6) a computer network event 301 6) a data input from an external system through an application programming interface 7778, An action option means an action option 6012 presented by, with, or within a notification type 60121 by a computer display screen or interface means 60, enabling a user to alter 92 a sensing network 10, initiate or control an object or device 80, affect a vehicular navigation system 85, alter a computer network 90, alter a recognition-primed rules-based decision support system 50, alter a decisions support notification type system 60111, alter a heuristic system 99991, or communicate through an external applications program interface 601, 7779, 888, to effect any of the foregoing.

A decision support system 50 further means a rules-based or other expert software system functioning to generate a decision support event by processing the meta data of an event 201011, and adding additional meta data 202011, before sending that event to a notification generation system 5011 in order to assist that system in generating a notification generation system event 50501 or action option system event 60601.

A notification generation system 5011 further means a rules-based or other expert software system functioning to generate a notification generation system event 50501 and/or action option system event 60601, in some measure in association with a main heuristic system 99991.

In the preferred embodiment, a decision support system event 501 is an event generated by a decision support system, capable of being further processed by a notification generation system 5011 in order to generate a notification generation system event 50501 and/or action option system event 60601.

The real world means the world outside of, or sensed by, the integrated hardware-software system herein described, whether or not that world is inter-mediated by another hardware-software system.

Effecting an action in the real world means a user making a choice or decision whose end result is a change of mass, time, velocity, pressure, humidity, direction, altitude, depth, weight, motion, heat, light, gravity, strong or weak nuclear physics, electromagnetism, wave, radiation, chemical composition, or any change of state recognizable by natural science or physics.

A sensed event 1011 is any occurrence in time, space, or cyberspace subject to recognition by a user, or a user aided with technological means, or a sensing system 10.

Processed events 201 are sensed events that have been processed in any manner that assists with their management by a decision support system or notification generation system, and may contain one or more of the following meta data values: a unique identity, and/or intensity level, and/or an urgency level, with levels individually indicated or algorithmically combined into one value.

The decision support system event 501 includes one or more of the following notifications 6011 types, an alert, an alarm, an advisory, a status, a haptic means, or other.

Meta day may include for each or any event, an intensity level, and an urgency level, with levels individually indicated or algorithmically combined into one value. For example a sudden five degree fluctuation in temperature may be assigned a high intensity level, but without further data or decision processing, the urgency level may not be correspondingly high. A particular notification type 60111 would be assigned to each type of event or condition, and each type of action, including for each a level of intensity, and a level of urgency. For example, the combined highest level ranking of urgency and intensity might add a siren to the immediately lower level ranking that includes flashing display screen labels.

The decision support system 50 receives input from a sensing network 10 in the form of a processed event 201 created by the encapsulation 6060 in an event processor of a sensed event 1011 captured by an event sensor 101.

Elements of the system are here further described and enumerated: 1) A user sense input source means 120 enabling a user to 2) report an event 1202 perceived by at least one of the known human senses through any input mechanism, to 3) input an event through a technological recording means 1201, 4) a response interface 110 wherein a user chooses a direct action option 1101, 5) a user input through a technological means 13 such as mobile phone 15, tablet, or on-board vehicular computer 14, a vehicular safety system, status, and/or operations system 802, such as a transmission in park or drive or with a leaking fuel line, an aircraft parked, taxiing, or aloft, 6) a GPS or navigational system 801, 7) a direct human-to-machine or machine-to-machine communications system such as voice touch, or gesture input 1202, 8) an iterative decision support system event 5017, 10) an iterative notification generation system event 5018, 10) any heuristic loop, 11) a main heuristic system (MHS) 99998, 12) a snapshot 77 as herein defined, 13) a system snapshot 79, or 14) a heuristic snapshot 77881 as herein defined, 15) a referenced action external 88 to the system herein described, A user sense input source 120 comprises the means to input an event perceived by at least one of the known human senses 1201, or inputs a user controlled direct communication 1202 with the decision support system, notification generation system, or response interface or computer display means 60.

The decision support system 50 comprises one or more of the following rules based systems, working alone, together, or in set, combination, or permutation, utilizing rules created by users, those with knowledge pertaining to a specific rules set, or the system described herein: 1) a theater of operation rules set, 2) a scenario rules set, 3) a response rules set, 4) a direct action rules set, 5) an available asset rules system, 6) an available mission rules set, 7) an available weapons rules set, or 8) an available sensing rules set, 9) an available user rules set, a 10) a user training level rules set, 11) an available assets rule set, 12) a human life action consequences rules set, 13) a human safety rules set, 14) an environmental consequence rules set, 15) a human attention factors rules set, 16) an external reporting rules set, 17) a rules set based upon the occurrence, context, number and timing of time counts 07 of responses and their context, 18) a rules set based upon the occurrence, context, number and timing of negatives 06, 19) a rules set based upon occurrence, context, number and timing of nulls 08, 20) a human factors rules set, 21) a rules set based upon the, occurrence, context, number and timing of selection of an alternate action option 09, 22) an asset threat level rules set, 23) a user preference rules set, 24) a location factors rules set, 25) a time period or radius rules set, 26) a matching correspondences and associations rules set, 27) a display means rules set, and 28) a rules set regarding the use, context, and applicability of rules sets, any, some, or all of which rules sets might interact with any system event or the meta data of any system event to generate a decision support system event 501 or to create a reiterative cycle to generate a decision support system event 501 again.

The rule-based system utilizes a set of "if-then" statements that uses a set of assertions, to which rules on how to act upon those assertions are applied, deriving execution instructions from a starting set of data and rules The operations of the decision support system 50, the notification generation system 5011, and the heuristic system 99991 utilize one or more domain-specific expert systems operating alone, or in set, combination, or permutation, comprising a dialog interface in the response interface 60, an inference engine utilizing a rules-based system and pattern recognition system in the decision support system 50, the notification generation system 5011, and the heuristic system 99991, and a knowledge base in the storage means 5050.

The pattern recognition means recognizes similar containers with meta data by comparing the unique mathematical signature of each of their unique identities and meta data values as derived from the nodes of their tree structures and leaves utilizing programming similar to Haskell, ML, or the symbolic mathematics language Mathematica utilizing syntax for expressing tree patterns and a language construct for conditional execution and value retrieval based on it, or a one-by-one checking of alternative patterns yielding a conditional programming construct.

Referring now to FIG. 2 and FIG. 3, the notification generation system 5011 enables the comparison and manipulation of containers 201, 2020 . . . and meta data (201011, 20201, 60201, 636, 837, 937 . . . ) in registers (20101, 20201, 60201 . . . ) by means of one or more rules based systems relating to communication with users, operating alone, or in set, combination, or permutation, 1) a user training level rules set, 2) a user experience level rules set, 3) a user number and availability rules set, 4) an available notification type rules set, 5) an urgency level rules set, or 6) a chance of success rules set, 7) a chance of communications success rule set, 8) a human factors rules set including stress and health, 9) a matching correspondences and associations rules set, any, some, or all of which rules sets might interact with any system event or the meta data of any system event to generate a notification generation system event 50501 on a computer display screen or response interface 60.

Notifications 6011 are presented with, within, or by a notification type 60111 through a notification means 6921.

Action option 6012, are presented with, within, or by a notification type 60121 through a notification means 6922.

The presentation of an action option 6012 or a notification 6011 on or in a response interface or digital display means 60 might include one or more meta data items indicating the rule system and/or exact rule used utilized by the decision support system event notification type system, or the decision support system. The presentation may further include meta data item from the sensed event 201.

The decision support system event 501 is further processed in an integrated or sequential notification generation system 5011 to generate notification types 60111, 60121, for example, 1) for notifications, notification types, such as alert, alarm, advisory, status, observation, determined by meta data values indicating, notification urgency levels, intensity levels, or other whether as separate values or algorithmically combined into one value, 2) for action option types, colors corresponding to types of responsive action types, such as surveillance control, fire weapon, alter course, evacuate, or sound emphasis or signature corresponding to urgency levels, intensity levels, human consequence levels, asset consequence levels, environmental consequence levels, whether as separate values or algorithmically combined into one value.

A notification generation system 5011 further means a software based processing system generating associate notification types 60111, 60121, and notification means, 6921, 6922 with notifications 6011 or action options 6012.

A notification type 60111, 60121 means a class of notification such as an advisory, a warning, or an alert, associated with a particular means of catching a user's attention, i.e., a yellow visual highlight on a display screen, a flashing red light, or a buzzer.

An enhanced notification means an enhancement of a notification through any means, including but not limited to any particular stimulation to any of the human senses, intended to increase or focus attention, or better enable a user to discern or discriminate any element of information presented in a notification generation system event 50501, and/or action option system event 60601.

An action option 6012 is an opportunity for a user to 1) effect an action in the world, 2) alter a sensing network or computer network or any aspect of the herein described telematic network, 3) alter, inform or control a vehicular navigation system, 4) control an object or device, or 5) communicate through an outbound application programming interface 601, 7779, 888.

On the response interface a user 01 is afforded a means to select 1) at least one action option 6012, 2) at least one action option from an alternate action option set 09, 3) reject all action options 06, 4) offer no response 08, 5) concur with or rate 92 one more, or all of the elements of an action option system event 60601, 6) concur with or rate 91 one more, or all of the elements of a notification generation system event 50501, 8) concur with or rate 93 one more, or all of the elements of overall mission efficacy in a sense-and-respond cycle 33441, 8) concur with or rate 94 one more, or all of the elements of the main heuristic system 99991, while a time counter 07 records the time that a user takes to respond.

A response time counter 07 measures the time between the occurrence of a notification generation system event 50501 and/or an action option system event 60601 and a response by a user.

In the preferred embodiment, upon the occurrence of any event within the system as herein described, the system records and stores a snapshot 77, for presently occurring, or for last occurring, or for next occurring, or any of these in any combination, one or more of the following, alone, or in set, combination, or permutation, including all associated meta data, the sensed event 1011 or network event 301 and/or pattern of same, the processed event 201 or pattern of same, the decision support system event 501 and/or pattern of same, the notification generation system event 50501, the action option system event 60601, the selection of any action option 6012 by a user, any alternate action option selected 09, the rejection by the user of all action options 06, the failure by the user to respond 08, any evaluation 91, 92, 93 entered by the user, and the time counted by the response time counter 07.

A mission evaluation 93 means for an event cycle 33441 any kind of rating inputted by the user evaluating the efficacy of engagement with the system described herein effecting an intended or productive action or result in the real world, whether by event cycle 33441 or any grouping of event cycles.

An event set means any grouping of more than one event assembled or notated into a group by any logic or pattern, including but not limited to a sequence, a time, a location, a beginning and end, or type of engagement.

Logical containers with registers are advantageously used to create notification one, more, or all of the following: notification generation system events 50501, action option system events 60601, processed events, decision support events, notifications, notification content, notification types, notification means, action options, and action option types, or to containerize snapshots 77 as further described herein, or to import and export data through application program interfaces.

Each container or pattern is advantageously provided with a unique and permanently lifelong identity within the system herein described or within the integration of same into any other system through an application programming interface for data import or export.

The use of containers and registers efficiently enables the rules-based expert systems to separately evaluate, process, join, separate, parse, use set theoretic operations on, or match containers, events, decision support system events, notification generation systems, patterns, user responses, user evaluations, user elected action options, notifications, notifications content, notification, types, and notification means.

Meta data items, values in registers, attributes, variables, or of sensed events, processed events, decision support systems, decision support system events, and notification generation systems, comprising notification content, types, and means, is shared, transferred, averaged, equated, parsed, combined, added, subtracted, divided, multiplied, matched, graphed, equated, compared, or mathematically or symbolically operated upon to serve as variables or components in equations amongst all processing systems on the network including export to external systems.

The storage means 5050 comprising any form of fixed memory, live RAM memory, and/or CPU memory or combination thereof, records and stores, event by event or network event by network event, or set by set of real world events or network events, or in a snapshot 77, system snapshot 79 or heuristic snapshot 77881, as indexed by, using one or more of the following, alone, or in set, combination, or permutation: 1) specific event, 2) event type, 3) event intensity, 4) event urgency, 6) event class, 6) user, 7) user type, 8) user training level, 9) user rank, 10) user age, 11) user sex, 12) user class 13) specific notification, 14) specific notification type, 15) notification level, 16) notification means, 17) event patterns, 18) location, 19) time) 20) a snapshot 77, 21) a system snapshot 79, or 22) a heuristic snapshot 77881, or 22) any of these, alone or in set, permutation, or combination, as recorded at the time, or within a radius of time, of each user response, and/or at the time of each real world event, a direct user evaluation inputted in a quantitative or qualitative rating of the performance of the decisions support system 91 or of the notification generation system 92, or of the overall mission efficacy 93, pertaining to the real world efficacy of the one or more action options, in a storage means 5050, or in live RAM memory, or CPU memory, snapshots 77, system snapshots 79, or heuristic system snapshots 77881, represented by a data tree, a matrix, a sequence, a pattern, a list, a container with meta data, or other, whose values designate one or more of the following, alone or in set, combination, or permutation: 1) response time to select an action, 2) response time to select an action per type of event, 3) response time to reject all actions, 4) response time to select an alternate set of actions, 5) response time to select an action from an alternate set, 6) the decision support system event generated by the decision support system, 7) the decision support system event notification type, 8) the action option event or events sent to the display means, 9) the action option chosen by the user, 10) the alternate action open chosen by the user, 11) a user selected specific concurrence or rating 92 with one or more action options or action option types, 12) a user selected specific concurrence with, or rating of, a) 91 one or more notification generation system events 50501, b) 92 one or more action option system events 60601, c) the main heuristic system 99991, or d) overall mission efficacy 93, 13) the rejection of all action options 06, 14) the failure to respond 08, 15) the time for the user to make a response after a notification becomes known 07, 16) the failure of a user 06 to respond after a set period of time after a notification generation system event 50501 has become known, 17) the same as contained in this paragraph for an action taken outside the system herein described, 18) a snapshot 77, a system snapshot 79, a heuristic snapshot 77881, including any of these, alone or in combination, of this specific paragraph at the time of each user response, and/or at the time of each real world event, sensed event 1011, or inputted event 13, and/or any pattern of any set or combination of the foregoing, and/or any repetition or pattern of repetition of any set or combination of the foregoing.

Referring now to FIG. 2, in the preferred embodiment, data sources from an external data source 701 inputted through an application programming interface through a direct data means 11, or obtained through an event sensor 101 with meta data M, or a mobile device or network 15 with device content 151 with meta data W and notification preferences 251 with meta data V are processed in an event processor 20 to create a processed event container 201 with registers 20101 containing meta data including processed event meta data 201011 M, W, V.

The processed event container 201 is additionally processed in the decision support system 50 in order to generate a decision support event 501 within a decision support event container 2020 with registers 20201 and meta data 20201 A, M, V, Z, Y, Z in order to generate action options 6012 within an action option container 2020 with action option registers 60201 and action option register meta data 602011.

The decision support event 501 is additionally processed in the notification generation system 5011 to generate, in the form of a container with meta data registers containing meta data, 1) a notification 6011 with meta data M, notification content 592 with meta data M, notification type 60111 with meta data M, and a notification means 6921 with meta data M, and by similar construction, 2) an action option notification 502 comprising an action option 6012, an action option type 60121 with meta data M, an action option means 6922, associated with or within an action option container 6020 with action option container registers 60201 containing meta data M 602011.

Processed event meta data 201011 in processed container 2010 registers 20101 is advantageously used throughout the heuristic telematic system with specific value in the decision support system 50 and the decision support notification type system 5011 including within a decision support system event container 2020 and decision support system event container registers 20201 with meta data 202011.

Each processing system may manage its own meta data M in its own system, such as event processor meta data X, or add or subtract meta data to its own system Y, combine or compute meta data Z or user generated meta data W, whether through containers within its own processing system or with other processing systems, or enable or cause interaction with the meta data in containers of other processing systems resulting in adding, subtracting, combining or creating new meta data A.

Each processing system may include or interact with the meta data of a container in another processing system, including the registers and their associated values within containers, or containers of other processing systems.

Each processing system may maintain interaction controls determining whether the meta data within it or the meta data of any individual container within it, might 1) alter the meta data of another processing system or container, 2) be altered by the meta data of another processing system or container, 3) be active and dominant toward the meta data of another container or system, 4) be passive and submissive to the meta data of another container or system.

Each processing system may include or interact with the meta data of container registers in another processing system, or include the containers or container registers, or their values through any mathematical operation, of other processing system, utilizing any processing means, including but not limited to rules-based systems, correspondence matching, pattern recognition, neural nets, or other, to maintain situational awareness and derive intelligence value from of the context and use of negatives 06, of nulls 08, of alternates 09, of time counts 07, of evaluations, 91, 92, 93, in relation to action options 6012, including content type, and means, or notifications 6011, including content, type, means, or any aspect of the system as further defined in the Figures.

Processing system means any system of the systems described herein, including but not limited to the sensing network 10, the event processor 20, the computer network 30, the communication means 40, the decision support system 50, the notification generation system 5011, the data storage means 5050, the heuristic decision support system 500, the heuristic notification system 600, or the main heuristic system 99998.

Whole system or system described herein means the system described by this specification and this filing.

An encapsulation by a container means 6060 means a software-based process whereby any digital element, bit, process, or container, is logically enclosed or connected, or logically enclosed or connected with meta-data, as to form a unique addressable entity.

In the preferred embodiment heuristic loops occur at fundamental levels, ultimately affecting the processing of one or more of the following, alone, in set, permutation, or combination, 1) sensed events 1011, 2) the generation of decision support events 501, 3) the generation of notifications 5011, 4) the generation of notification content 592, notification type 60111, notification means 6921, action options 6012, action options types 60121, action option means 6922, 5) the generation of process snapshots 77, system snapshots 79, and heuristic snapshots 77881, to be stored in the storage means system 5050, for the generation and utilization of progressively more comprehensive or inclusive process levels, including but not limited to the heuristic decision support system 500, the heuristic notification system 600, iterative decision support system events 5017, iterative notification generation events 5018, snapshots 77, system snapshots 79, heuristic snapshots 77881, and the heuristic system process itself 99998.

The heuristic system process might be symbolically represented or considered in the general form of 1) $H^N$, e.g., a heuristic loop as represented by a snapshot or heuristic snapshot raised to a progressively higher power, and/or 2) (H (mathematical or logical operation) $H)^N$, e.g., a heuristic loop interacting by a mathematical means, including but not limited to a set theoretic means, with a different heuristic loop, whether alternate, subset, or superset raised to a progressively higher power, and/or 3) H . . . H1 . . . H2 . . . H3 . . . H(N), e.g., a progressively evolving system, or any other logical or mathematical means of evolving a continuous looping and/or recursive system in such logical manner as might further heuristic operations, including but not limited to containerization, pattern recognition, pattern optimization, rules generation, rules operations, rules utilization, or set theoretic operations any or all of which are designed to optimize the effectiveness of action options, action option types, notifications, notification content, notification means, or notification types.

The heuristic system process includes the means to output the results of its processes through an application program interface to an external hardware-software system or biological intelligence 7779.

Referring now to FIG. 3, the elements of a heuristic notification system are shown.

Within element 1, is shown a heuristic decisions support system 500, comprising 1) a decisions support system 50 utilizing pattern, snapshot, list, sequence, matrix, and container meta data processing means 975, 2) a notification generation system 5011 utilizing pattern, snapshot, list, sequence, matrix, and container meta data processing means 975, 3) a processed event container 201, 4) a decision support event 501, 5) an event processor 20, 6) an iterative decision support system event 5017, 7) an iterative notification generation system event 5018.

Within element 2, a main heuristic system (MHS) 99998, is shown, comprising 1) an internal observation means 777, 2) rules generation 7774 means comprising a) user set rules, b) system set rules, c) rules derived from the use of the whole system described herein 3) synthesis 7778, 4) mathematical operations on meta data 99991, 5) a biological intelligence 6) an input application programming interface 7778, 7) an output application programming interface 7779.

Within element 3, is shown a heuristic notification system 600 utilizing (pattern, list, matrix, set, sequence, snapshot processing including, but not limited to, container meta data processing 976) operating with 1) an encapsulation means 6060, 2) user direct input 120, 3) evaluation by users 91,92, 93, 4) user technology input 15, 5) a response interface means or computer display means 60, 6) direct action options 1101, 7) a heuristic decision support system 500, and 8) a main heuristic system 99998.

Within element 4, a storage means 5050, shows a storage means holding a heuristic snapshot 77881 with meta data M, A, X, Y, Z, containing a system snapshot 79 with meta data M, A, X, Y comprising a snapshot 77, a container 44, a pattern 636, each with meta data M, and a list, a matrix, and a sequence, each with meta data M.

Referring now to FIG. 4 a general process flow is described. 1) An event Sensor 101 logs a sensed event 1011, 2) an event processor 20 creates processed events 201 from the sensed event 1011 or a computer network event 301 using encapsulation 6060 or other mathematical signature, 3) processed events 201 are communicated over a communications means or system bus 12, 40 to, 4) a decision support system 50 that utilizes containers and meta data operating through rules, associations, and pattern recognition of system meta data M (A, W, X, Y, Z . . . ), user 01 response evaluations 91, 92, 93, response time counts 07, lack of response 08, user rejections 06, user alternate action option selections 09, snapshots 77, system snapshots 79, and heuristic snapshots 77881, in order to generate a decision support system (DSS) event 501 comprising action options 6012 and new meta data that is additionally added in order to be processed in 5) a notification generation system 5011 that generates notifications 6011, including notification content 592, a notification type 60111, and a notification means 6921, and notification generation system events 50501, and 6) for action options 6012, an action option notification 60601 containing the action option(s) 6012 received from the decision support event 501 and an action option type 60121, and an action option means 6922 to present to a user 01, whereby 7) the user selects an action option 6012 associated with a notification type 60121, or 8) selects an action option alternative 09, and/or 9) inputs a notification evaluation 91 and/or 10) inputs an action option evaluation 92, or 11) inputs a mission effectiveness evaluation 93 or a heuristic system evaluation 94, or 12) rejects all options 06, or 13) fails to respond 08, while 13) the time counter records the length of time of the user response 07, and 14) the system records and stores 5050 all data input, responses, events, and event processes in one cycle from the occurrence of an event to an action in response by a user to be utilized to create snapshots 77 to integrate into the main heuristic operation 77881 and to introduce into the initiation of the cycle as a sensed event 1011, and to be available to the decisions support system 50 and the notification generation system 5011 as needed.

Figure 5:
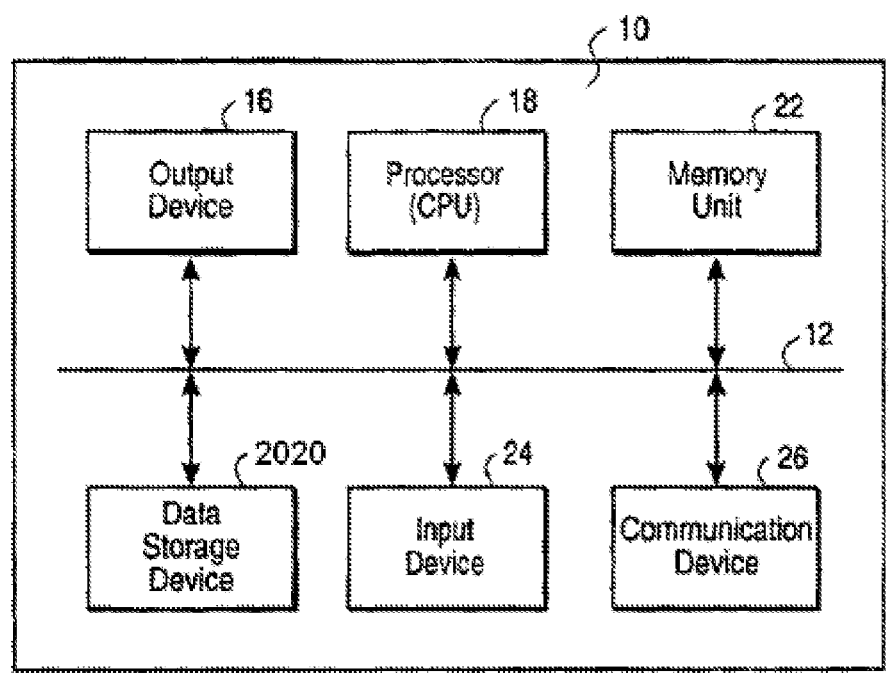
FIG. 5 depicts the basic elements of the hardware-software system enabling the efficient interaction, operation, and effects of the components, processes, and means described herein.

Referring now to FIG. 5, a hardware-software system capable of enabling the efficient interaction, operation, and effects of the components, processes, and means described herein, comprising an input device 24, a CPU processor 18, a data storage device 2020, an output device 16, a memory unit 22, a communication device 26, and a data bus and/or communication means 12, is shown.

Figure 6:
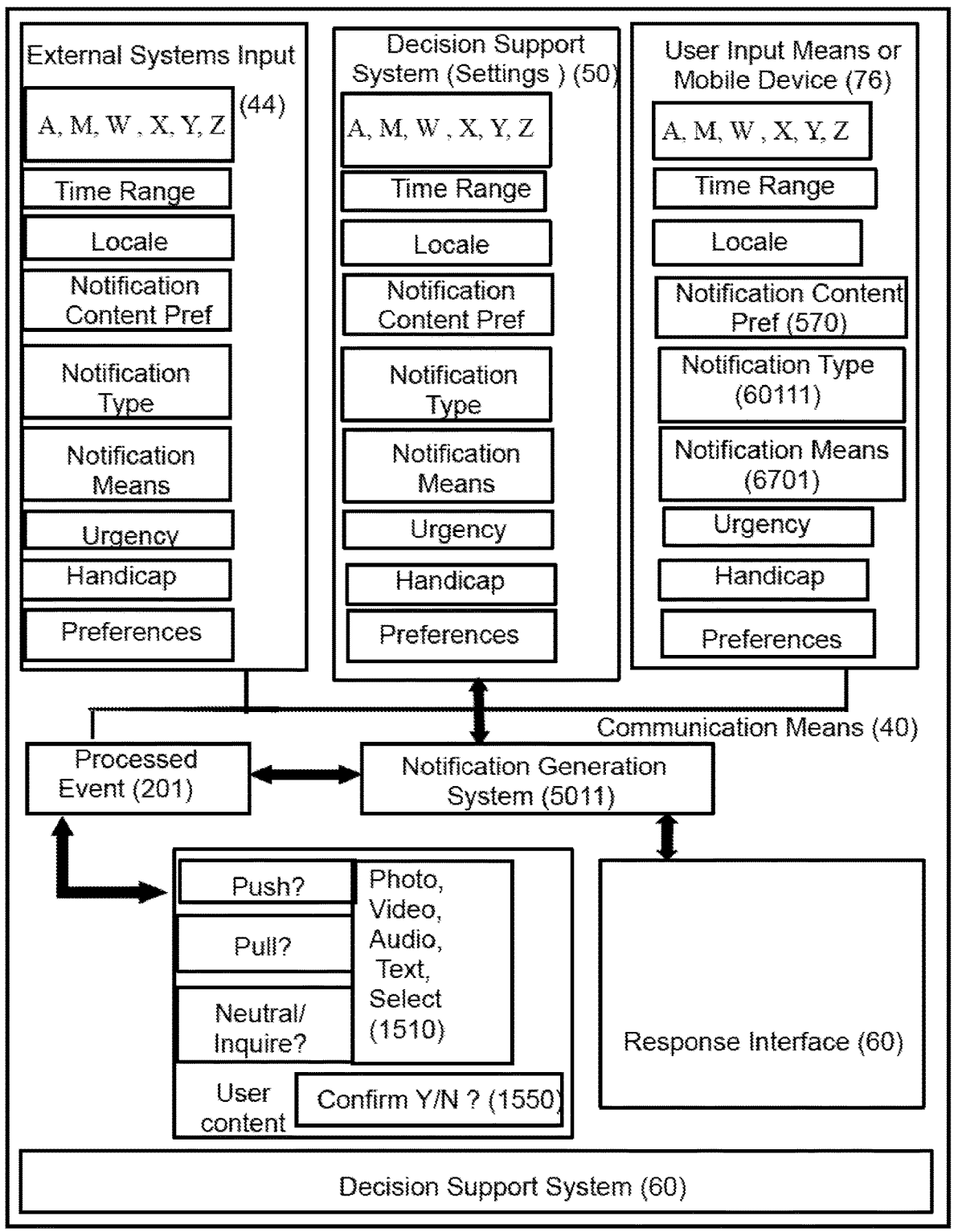
FIG. 6 depicts some types of meta data, attributes, or values that can be exchanged amongst an external system, a decision support system, a user input means or mobile device, event processing, notification generation, mediated or controlled personal content, and a response interface.

Referring now to FIG. 6, exemplary meta data parameters A, M, W, X, Y, Z are shown for the basic components of a display advertising network, comprising 1) a mobile device or devices including but not limited to smart phones, computer tablets, or on-board computers on vehicles or input means 76, including but not limited to gesture, touch, video, or voice 2) external systems input 44, 3) a decision support system 50, 4) a processed event 201, 5) a notification generation system 5011, 6) system settings, 7) communication means 40, 8) a response interface or computer display means 60, and 9) a means 1515 for a user to set active, passive, neutral, or no conditions for individual pieces of content, folders of files or content, or the device, and of neutral, a means for a user 1550 to respond with an affirmative or negative to a request to access settings or content set as neutral. On the user input means 76 meta data parameters including time and location, whether set by user, such as only within one mile of home or two miles of work and only between 7:00 AM and 8:30 AM and 5:00 PM and 5:30 PM, and only if the notification includes a minimum of a fifty percent discount pertaining to tires, or allowed to be visible to a requesting network, notification content preferences, such as those pertaining to sports memorabilia, a notification type, such as all notices being delivered at the level of an alert, a notification means such as by email, or multimedia text with a vibration, an urgency filter, such as might allow only emergency message to be received, any personal handicap, such as bad hearing, or any other personal preferences. Corresponding meta data is maintained by the network in order to assist in the formation of responsive notifications 6011. The means for inputting into the system corresponding meta data and other meta data, such as temperature or consumer price index, would be offered as an application programming interface to enable an external system to input, or be sensed for, desired meta data. A sensed event whether captured by long range RFID, near field communication, perceived gesture or voice, or touch, or mobile Web, or other, processed in a processed event 201 as processed by the decision support engine 50 and a notification generation system 5011, results in a personalized advertisement becoming known to a user 01 accounting for all user set parameters, and/or external system parameters, and all notification 6011 parameters for notification content 592, notification type 60111, and notification means 6921.

Active means broadcasting or pushing out information and settings to any requesting network.

Passive means information open to any requesting network to be pulled or altered.

Neutral means open to a pull request to be confirmed or denied.

No condition or setting means not subject to any interaction with any network.

Figure 7:
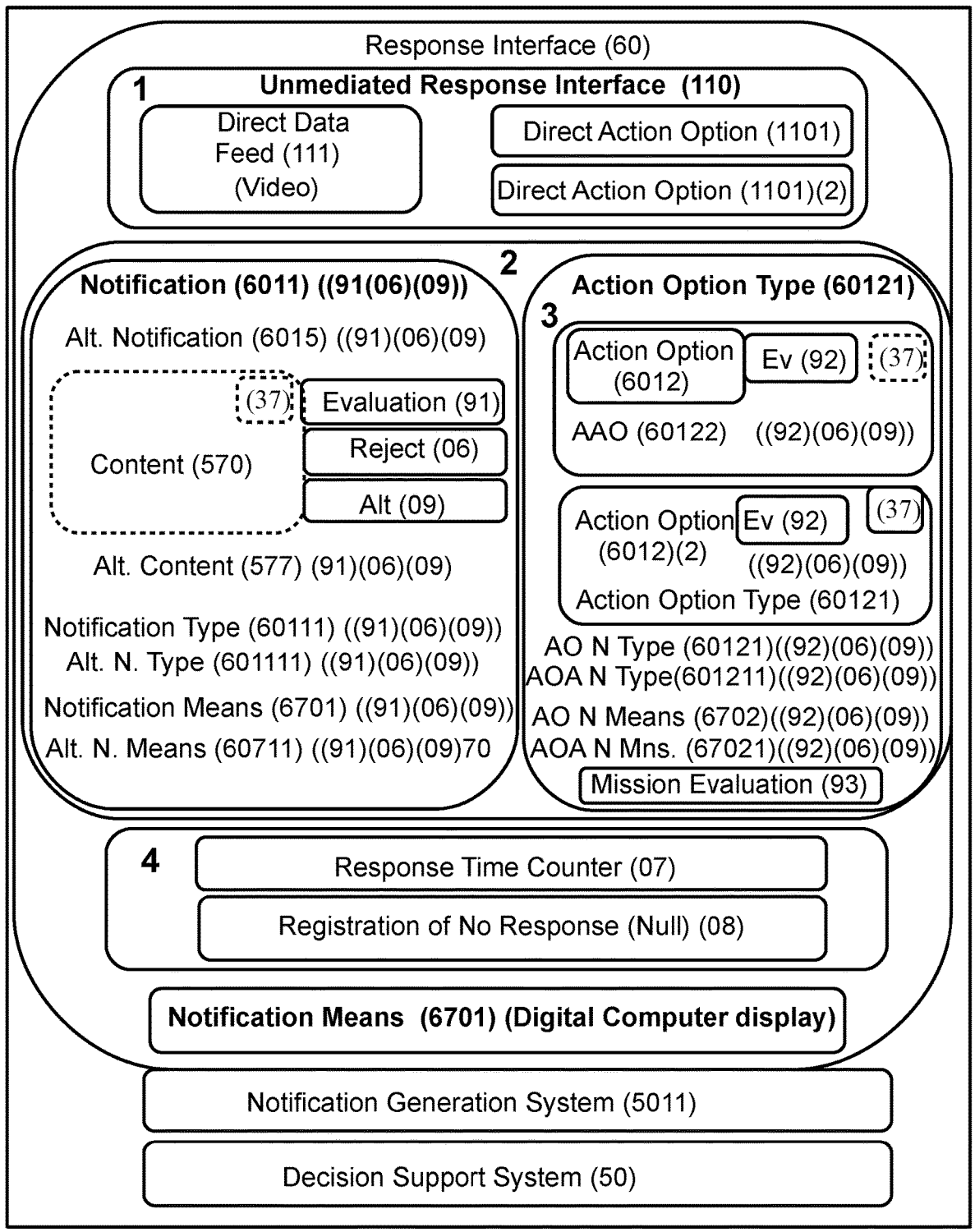
FIG. 7 depicts a detailed view of the principal elements of the response interface.

Referring now to FIG. 7, the elements of the response interface 60 when associated with a notification generation system 5011, and decision support system 50, are shown. On a response interface 60 expressed through the notification means 6921 of a computer display including a graphical user interface, four elements are shown comprising three user interaction related elements and one system related element enabling a heuristic dialog to be established between user and system through the response interface 60 in continuous or continual loops that can be nested without limit.

Within element 1 is shown a direct data feed 111 showing an unmediated response interface 110 comprising 1) a video of the real world, or a video simulation of the real world, and 2) pre-programmed direct action options 1101 offered as possible responses, such as launch additional surveillance options one through ten, or fire any one of weapons one through ten.

Within element 2 is shown a notification 6011 associated with a notification type 60111 and a means for a user to evaluate 91 by a rating, or to reject 06, or select alternates 09, to 1) the notification 6011, 2) alternate notifications 6015, 3) notification content 592, including a possible offer fulfillment 37 offering to a user and enabling a interaction with another system such as navigation system, or other, whether on-board in a vehicle, or operating through a mobile device for walking or driving or other guidance or transport directions to fulfill, whether related to the past, or in the present, or to be performed in the future, an advertisement or offer by interaction with the real world such as buy-local-now, navigate-to-buy, navigate-to-pick-up, navigate-to-fulfill, navigate-to-attend, navigate-to-transact, navigate-to-complete, drive-to-buy, walk-to-buy, be-transported to buy (taxi), or any additional concierge type functionality, 4) alternate notification content 577, 5) the notification type 60111, 6) alternate notification types 601111, 7) the notification means 6921, 8) alternate notification means 69211.

Within element 3 is shown a selection of action options 6012(1) and 6012(2) associated with an action option type 60121 and a means for a user to evaluate by a rating for effectiveness, 92, reject as not useful, pertinent, or historically effective 06, or select from a list of alternate action options 09 to, 1) each, any, or all of the action options 6012(1), (6012)(2), 2) alternate action options 60122, 3) action option notification types 60121, 4) action option alternate notification types 601211, 5) action option notification means 6922, 6) action option alternate notification means 6921.

Within element 3 is shown a means to evaluate 93 by a rating overall mission effectiveness for the action option selected, Within element 4 are shown two system background operations, being a) a time counter 7, operating within the system to record the amount of time between the appearance of a notification and the selection of an action option, and b) a means to register a lack of response 08 (a null).

Figure 8:
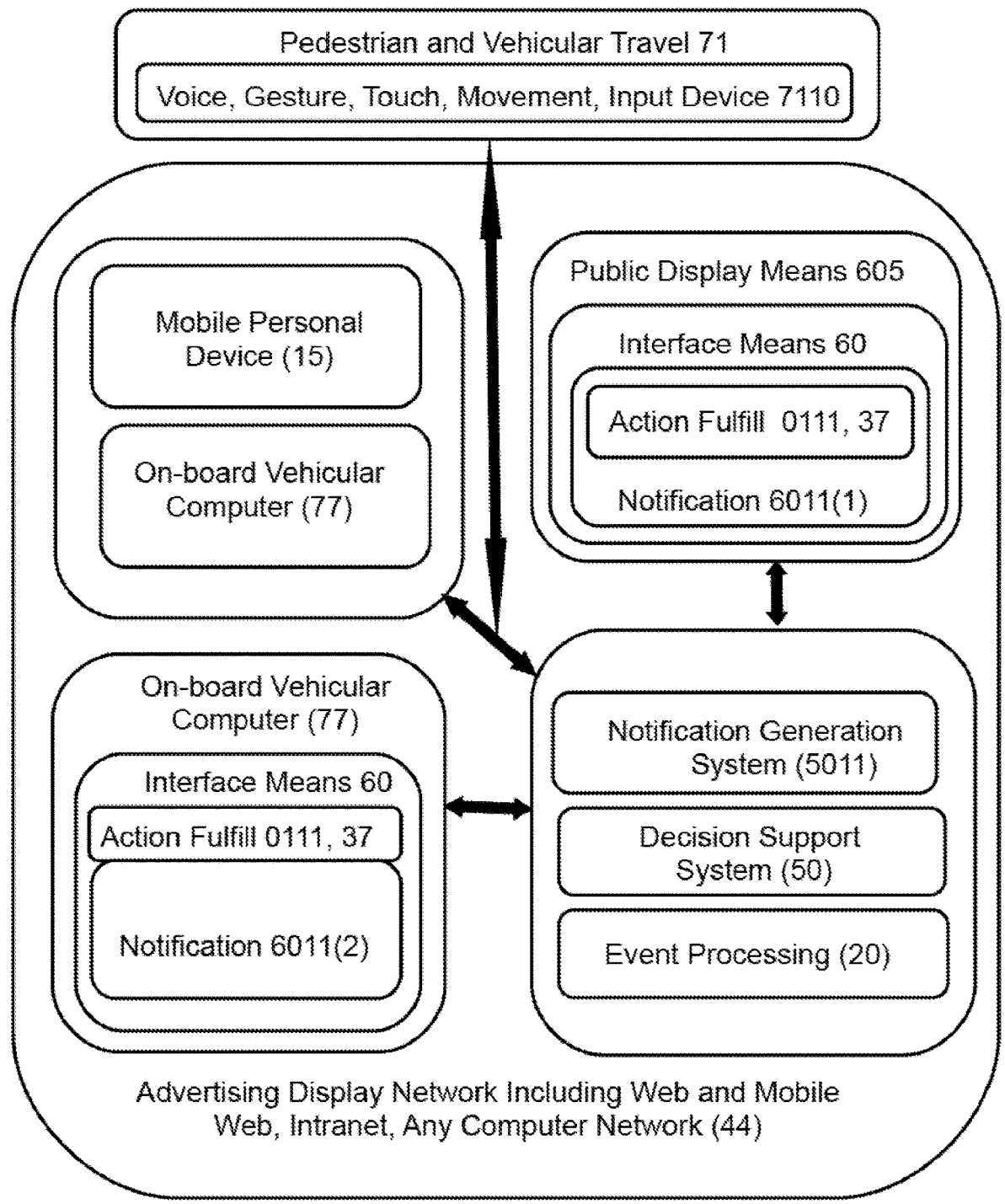
FIG. 8 depicts an advertising display network for pedestrian and vehicular travel using voice, gesture, movement, or direct input, interacting with a notification generation system, decision support system, or event processing system.

Referring now to FIG. 8, the elements of an advertising display network 44 operating on the Web, mobile Web, an Intranet, or a computer network, comprising 1) an input or capture means 7110 utilizing voice, gesture, touch, movement, RFID, near field communications, data exchange, input device, mobile device 15 or on-board vehicular computer 77, or other, 2) the means to engage users 7110 including but not limited to mobile device users, auto driver and passengers, pedestrians in shopping malls, airports, shopping districts, homes, or commercial buildings 71, with 3) a means of displaying or making known notifications 6011(1), 6011(2), including, but not limited to advertisements, or offers, on mobile devices 15, on-board vehicular computers 77, or public display systems 605, 4) a means of generating effective responsive notifications 6011 to sensed events 1011 or data, including but not limited to, advertisements, promotions, offers, enticements, or leading content, the goal of which is the promotion and the sales of goods and services, through the user of 5) a decision support system 50, 6) a notification generation system 5510, 7) an event processing means 20, and 8) an action fulfillment button 0111, 37 visible or present to the user of an on-board vehicular computer response interface means 77, mobile device means 15, and/or public display means 605, such as a digital display screen 60, indicating the availability of an enabling action fulfillment option, including, but not limited, navigational assistance for driving or walking to a place of fulfillment, or direct control of a vehicle in response to an advertisement, promotion, or offer.

Figure 9:
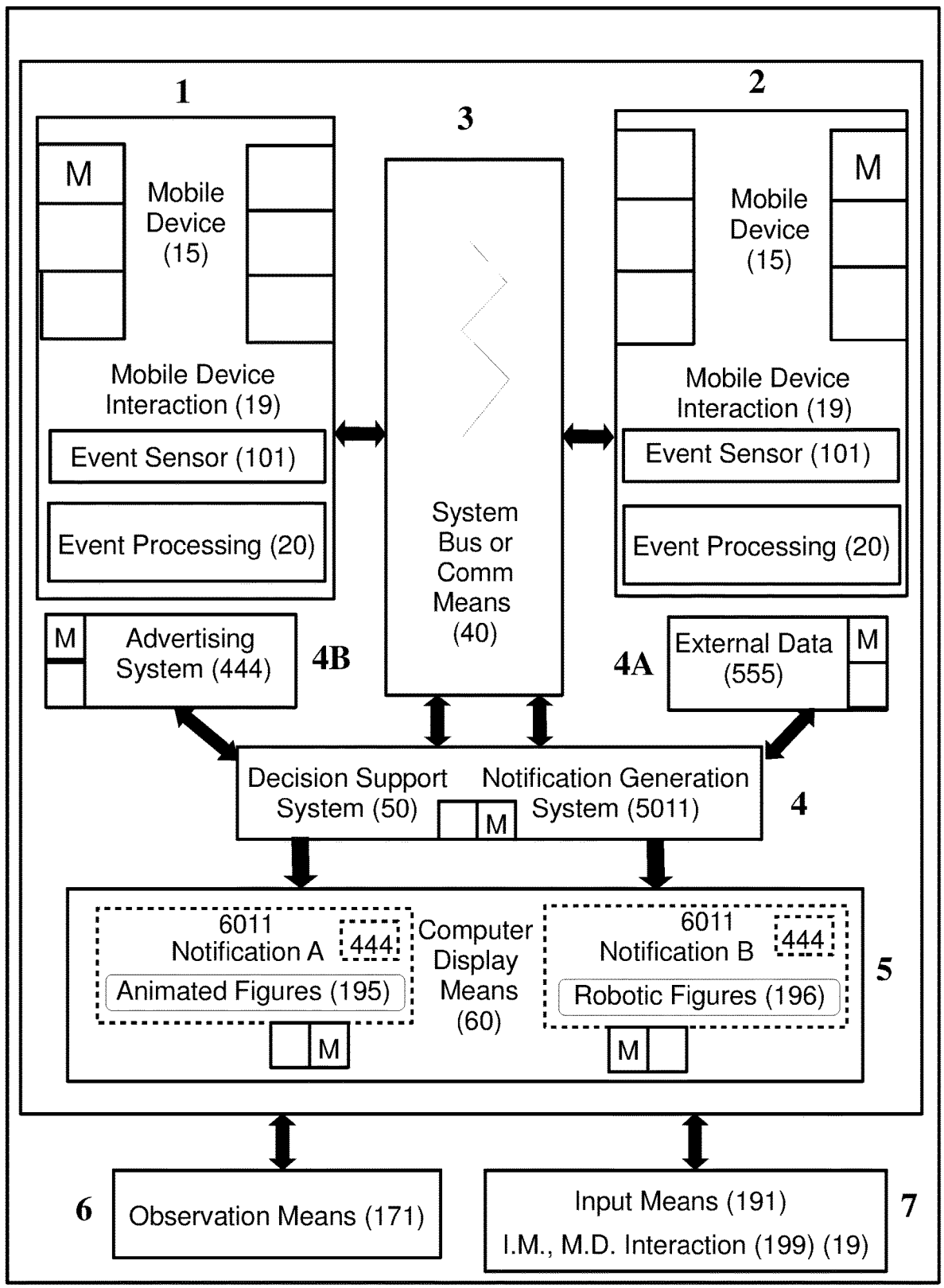
FIG. 9 depicts principal components of users on a mobile device platform interacting with a communication means to generate and deliver sensed or sensed and processed user interactions or input to a decision support system or notification generation system in order to present notifications for each of device 1 and device 2 on a computer display screen, including, but not limited to, advertisements and/or offers, seen at a first location of the mobile device users and also seen at a second external location through an observation means where ongoing events at the first physical location might be observed and interacted with at a second external location.

Referring now to FIG. 9, with associated enumeration from FIG. 1, for a mobile network with mobile devices and public computer displays, in element 1 and element 2, event sensors 101 within mobile devices provides data captured as sensed events 1011 from embedded sensing devices such as a GPS, camera, accelerometer, teslameter, magnetic direction or magnetic magnitude capture means, location tracking device, tilt mechanism, or other sensing means, to an event processing means 20 making user of meta data M, attributes, or variables in any capacity to send a sensed event 101 or processed event 201 to, in element 3, a communication means 40. In element 4, a decision support system 50 or notification generation system 5011 interacting with and exchanging data and content with, in element 4A, an additional external data means, and, in element 4B, an advertising system, utilizes the data from the communication means 40 that originated through the interaction 19 of users with one or more mobile devices 15 at a first location where there is a public computer display 60 to, as in Element 5, make one or more notifications 6011, advertisements or offers 444 visible on that public computer display 60. In Element 6 at a second location external to the first location where there is a means of observation 171 of the users interacting 19 with each other and the public computer display screen 60 at the first location, a different set of users as in Element 7 interact with the users and/or the public computer display screen 60 at the first location using input means 191 or mobile devices 15 to interact 199, 19 at that second location. There is generated from users interaction 19 or data input 13 on mobile devices 15 at the first location including a sensing network 10, and/or onboard vehicular computers 14 at any location, and/or user interaction 19, 199 at the second location, in conjunction with available external data 555, 111 as in Element 4A, and an available advertising system, network or exchange 444 as in Element 4B, notifications 6011, advertisements, and offers to appear on the computer displays means 60. Users both at the location of the public computer display 60 and at a second location where that computer display is being observed 171 through an observations means use mobile devices 15 to respond 19 and input devices 191 to respond 199, or respond repeatedly, to the notifications. As shown in Element 5 user interaction 19 at the first location or user interaction 199 at the second location might themselves each be broken into two or more separate groups with the interaction 19 from each group generating and/or altering a separate notification 6011 A appearing simultaneously on the public computer display means with a notification appearing from a different group 6011 B. Notifications might include, as in Element 5, animated figures 195 or telematic movements or expressions through robots 196.

Referring now to FIG. 1, with associated enumeration from FIG. 1, for a mobile network with mobile devices and public computer displays, in Element 1 and Element 2, event sensors 101 within mobile device 15 provides data captured 13 as sensed events 1011 from a sensing devices such as a GPS camera, accelerometer, teslameter, magnetic direction or magnetic magnitude capture means, location tracking device, tilt mechanism, or other sensing means when a user, a group of users, or different groups of users 01, using mobile device as sensing 101 or interaction devices to 1) interact 19 with a mobile device through use of the device graphical user interface, or by physically acting upon the mobile device, and 2) utilize software running on the mobile device 15 as an on-board application or a website process the event 20 into a processes event 1011 and send it through the communication means 40 to a decision support system 50 and notification generation system 5011 to generate a decision support system event 501 or notification generation system type 60111. The decision support system 40 or notification generation system 5011 combine, synthesize, interpolate, or use a mathematical means to derive a resultant event from two or more users or two or more groups to produce a notification different than that derived from one user event or one group event. Further, the decision support system 40 or notification generation system 5011, in Element 5, when instructed, presents through the same computer display means 60, in a notification 6011 A and/or a notification 6011 B visible to users both immediately present at a first location as in Element 1 and Element 2 with public computer displays 60 as in Element 5 and at a second location 171 through a television, or Web means, as in Element 6.

Both users with mobile devices at the first location as in Element 1 and Element 2, and users who are remote viewers at one or more second locations as in Element 6 with an observation means 171, 19 through mobile devices 15, or, in Element 7, television input devices 191, such as television, remotes, or second screens on computer tablets linked to the television system, or any device capable of introducing an input at the second location, upon seeing the computer display screen 60, can then respond with further input to be used to affect the mobile devices 15 or public display screen 60 at the first location. The interactions of each user or group of users might be used by the decision support system 50 or notification generation system 5011, whether mathematically synthesized or not synthesized, to generate on the display means a 1) whole graphic element, 2) a discrete part of a graphic element, such as a grain of sand filling a bucket, or 3) an alteration to an element, such as increase in size, such as one figure in notification 6011 A growing larger against another figure in notification 6011 B, as separate input is received from two different groups of mobile device users or mobile device user groups at a first location in Element 1 and Element 2 to generate as in Element 5 a notification 6011 A from the first user group in the first location, and a notification 6011 B from the second user group n the first location, or, alternately, from a first user groups a in Element 1 or Element 2 at a first location to generate in Element 5 a notification 6011 A, and from a second user group as in Element 6 and element 7, a remote viewing user group using an observing means 171 to view the first location utilizing an input means 191 at the second location to interact 19, 199 to generate a notification 6011 B. The further inputs commence the next cycle of notification content or alteration. By this means a notification such as a graphic image or animation appearing on a public display means is continuously altered by the ongoing input of users or groups of users.

Figure 10:
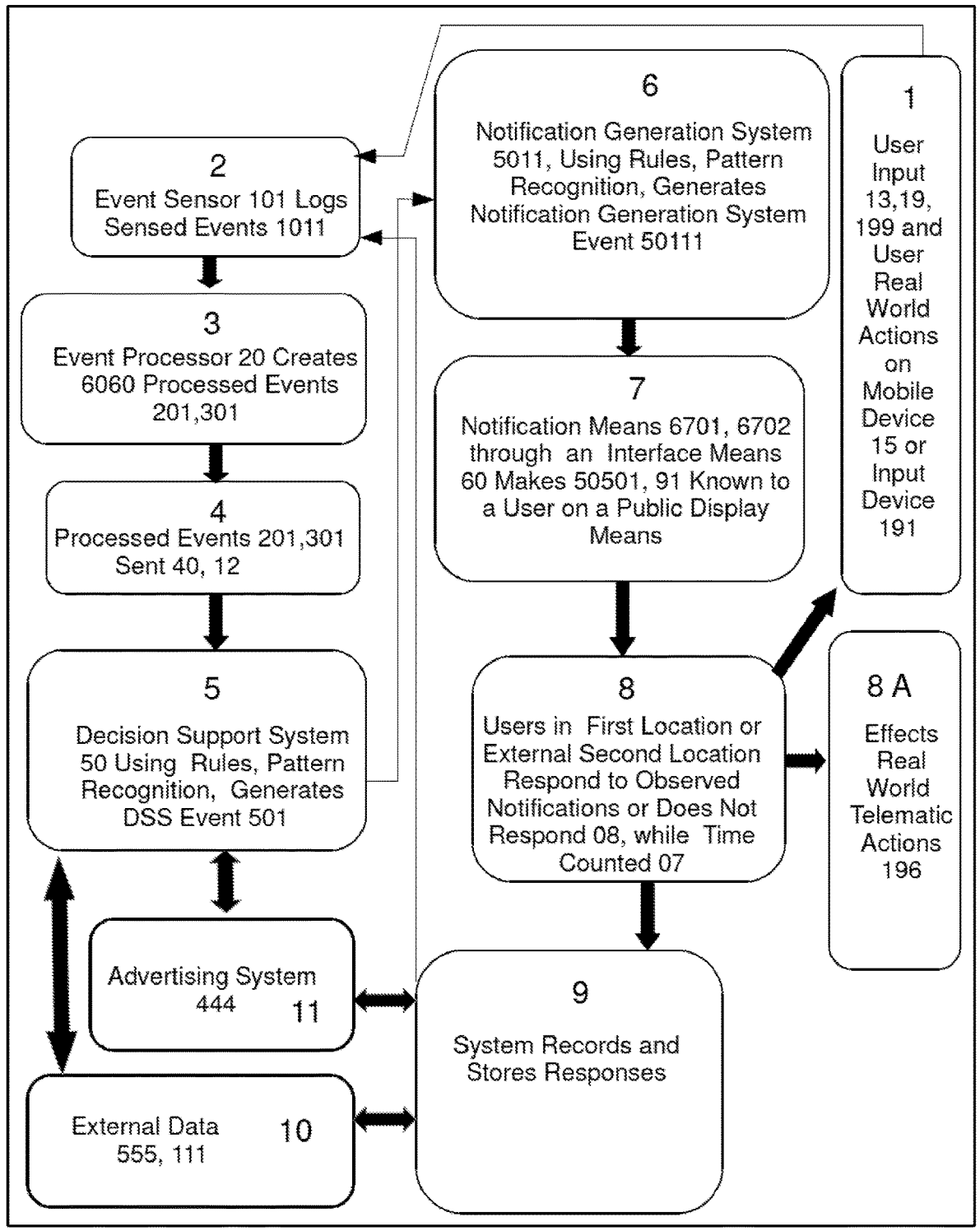
FIG. 10 depicts a descriptive process of, being a derivative subset of FIG. 4 adding an advertising system, the interacting elements of the mobile device and public computer device platform in FIG. 9, showing in Element 1 and Element 2 each a separate mobile device interaction utilizing a communication means to send those interactions to a decision support system or notification generation system in Element 4 that generates notifications for each of those devices to appear on a computer display means as Notification A and Notification B, which display means might be seen at a first location of the mobile devices users and also at a second external location through an through an observations means in Element 6 such that an input means at that external location as in Element 7 might interact along with the mobile devices at the first location in generating two or more separate and separately sourced notifications on the display means.

Referring now to FIG. 10, with associated enumeration from FIG. 1 or other figures herein, describing a process for a mobile network with mobile devices and public computer displays following Elements 1-9 including interaction and/or data exchange with Element 10 and/or Element 11, a user, a group of users, or different groups of users 1) interact 19 with a mobile device 15 through use of the device graphical user interface, or by physically acting upon the phone. 2) The mobile device captures a sensed event 1011 through the capture means of an event sensor 101 such as a GPS, camera, accelerometer, teslameter, magnetic direction or magnitude, location tracking device, tilt mechanism, or other sensing device and 3) utilizing software running on an on-board application or a website processes the event 20, 4) sends the event 20 directly or as a processed event 201 through the communication means 40 to 5) a decision support system 50 and/or 6) notification generation system 5011, either of which interacts with, an external data source 555, 111 as in Element 10 and/or an advertising system 444 as in Element 11. The decision support system and notification generation system combine, synthesize, interpolate, or use a mathematical means to derive a resultant processed decision support system event 501 or notification system generation event comprising notification type 60111, notification content 592 and/or notification means 6921, different than would have been generated from an individual processed event 201 or non-processed sensed event 1011 and utilize that result to generate and 7) send a notification 6011 to a public display means 60 visible to users both present at the first location where the interacting mobile device user 19 are present and 8) at a second location 171 where users are utilizing an observation means through a television, computer tablet, or Web means to view the first location. Both present viewers at the first location and remote viewers at one or more second locations, upon seeing the display screen, can then respond with further input 19 through mobile devices 15 or television input devices 191, such as television, remotes, or second screens on computer tablets linked to the television system, or any device capable of introducing at the second location an input to interact 199, 19 with the mobile devices 15 or display screens 60 at the first location. As in Element 9, the system records and stores the events to become as in FIG. 1 snapshots 77 or further network events 301.

Figure 11:
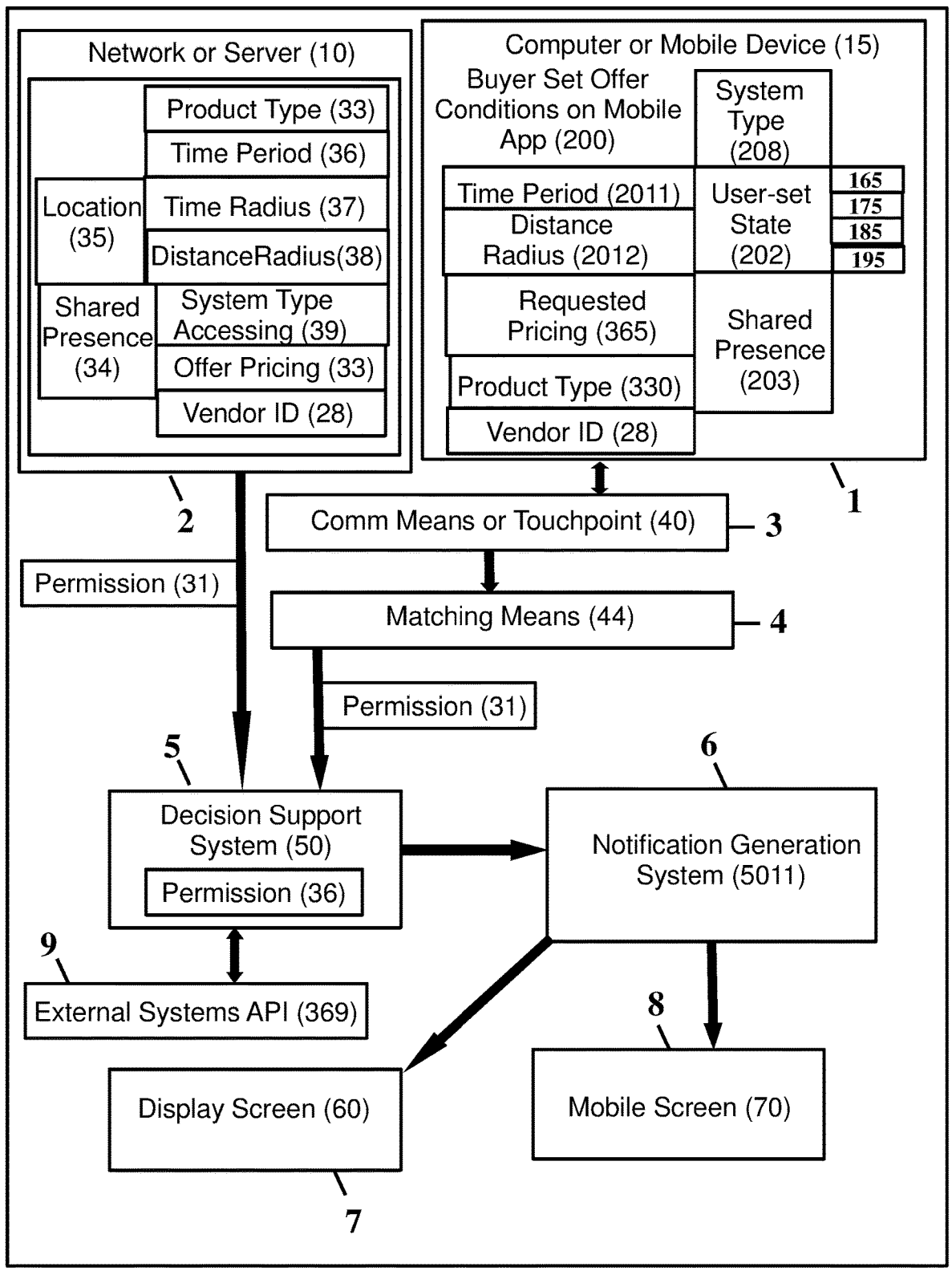
FIG. 11 shows the eight principal elements of the consumer and advertiser dialogue controls.

Referring now to FIG. 11, element 1, a software application on a computer or mobile device enables a user to enter the user's preferences 200 on their mobile device for the following 1) a time period 2011 and/or radius of distance 2012, 2) the type of system that may access it 208, such as home, mall, workplace, government, public, vendor, promoter, or advertiser, whether controlled with a permission 31 by a password, key, definition, or other, of an inquiring system, 3) one of the set-by-user states 202 of a) broadcast data openly for any system to hear 165, b) allow data to pass to all inquiring systems 175, c) allow a system to submit an approval request for approval by the user 185, or d) do not allow data to pass to inquiring systems 195, 4) a desired or requested pricing or discount level 365, 5) any of the preceding according to a list of acceptable inquiring systems by vendor identification 28, 6) any of the preceding in (3) according to a period of time 2011 and/or radius of distance 2012, 7) any of the preceding in according to the recognition of shared presence or presence not shared.

Referring now to FIG. 11, Element 2, a computer network or server holds the following parameters: 1) a time period 36 and/or radius of distance 38 for a vendor's or advertisers engagement of a consumer with an offer or advertisement, 2) the type of system that may access it 39, whether controlled through a permission 31 by a password, key, definition, or other, of an inquiring system, 3) four different responses or actions corresponding to each of one of four set-by-user states 202 of a) broadcast data openly for any system to hear 165, b) allow data to pass to all inquiring systems 175, c) allow a system to submit an approval request for approval by the user 185, or d) do not allow data to pass to inquiring systems 195, 4) a desired pricing or discount level 33, 5) a vendor identification 28, 6) the general location or vicinity where the goods or services are being offered, 7) any of the preceding according to a list of acceptable inquiring systems 39, 8) any of the preceding in (3) according to a window of time 37 and/or radius of distance 38, 9) any of the preceding according to the recognition of shared presence or presence not shared 204.

Referring now to FIG. 11, with associated enumeration from FIG. 1 or other figures herein, the eight principal elements of the preferred embodiment are shown in their principal relationship, comprising 1) buyer set preferences or conditions set by a user on a computer or mobile device 15, 2) seller, promoter, or advertiser set preferences or conditions set by a seller, promoter or advertiser on a network or server 10, 3) a communication means or touch-point connected to a communication means 40, 4) a matching means 44 by which buyer set preferences or conditions set by a user are filtered or matched with seller, promoter, or advertiser set preferences or conditions set by a seller, promoter or advertiser, a network or server, 5) a decision support system 50 where additional data might be integrated to provide to a rule-based system or other decision support type system 6) a notification generation system 5011, using matching or rules to generate a responsive notification, advertisement, coupon or price discount, 7) a display screen 60 and, 8) a mobile screen 92 on a mobile device.

Referring now to FIG. 11, Element 1, buyer set preferences or conditions set by a user on a computer or mobile device 15, are shown comprising 1) a recognition of shared presence 203, 2) a designation of an acceptable system or systems 39 for an inquiring external system 369, 3) a user-set general state 202 comprising a) an instruction to broadcast 165 or reveal user preferences, b) an instruction to allow user preferences to pass to an inquiring system 175, c) an instruction allowing an inquiring system to request permission to access information 185 regarding user's preferences or profile, d) and instruction to not allow any data to pass to inquiring systems 195, 4) requested pricing 365, 5) an acceptable zone or radius of distance 2012 of existing purchase interest, 6) an acceptable time period 2011 of existing purchase interest, 6) an acceptable product type 330.

Referring now to FIG. 11, Element 2, there is shown seller, promoter, or advertiser set preferences or conditions set by a seller, promoter or advertiser on a network or server 10 comprising a) a general location 35 in which goods or services being offered by a seller, advertiser, or promoter are available to be obtained, b) a time period 36 or radius of time 37 during which those goods or services might be obtained, and/or in which a vendor or advertise might wish to promote to a consumer, c) a radius of distance or zone of distance in which goods or services being offered by a seller, advertiser, or promoter are available to be obtained 38, and/or in which a vendor or advertise might wish to promote to a consumer d) the vendor or mall identification 28, e) the consumer requested range of discount or pricing or coupon 33 to which this system will respond, f) the product type 330 to which this system will respond, g) the system type accessing 39 to be announced, h) the co-determination of shared presence 204.

Referring now to FIG. 11, Element 3, a communication means or touchpoint connected to a communication means 40 provides a means for all elements in FIG. 1 to communicate and interact.

Referring now to FIG. 11, Element 4, there is shown a matching means 44 for identifying, comparing, filtering, or matching one or more criteria of element 2 with the corresponding criteria in element 1.

Referring now to FIG. 11, Element 5, there is shown a decisions support system 50, by which a rules-based or other system might integrate additional data.

Referring now to FIG. 11, Element 6, there is shown a notification generation system 5011 whereby an advertisement, coupon, or price discount might be generated.

Referring now to FIG. 11, Element 7, there is shown a display screen wherein an advertisement coupon, or price discount, might be presented to a consumer.

Referring now to FIG. 11, element 8, there is shown a public computer display screen 60 wherein an advertisement coupon, or price discount, might be presented to a user. A network or server matches through a communication means 40 or touchpoint connected to a communication means the conditions or preferences established by advertisers, promoters, or sellers of goods or services with a) delivery conditions set by a unique seller, and/or b) conditions of product and pricing set by a unique seller. The established matches are sent to a decision support system 50 where those matches are matched through a matching means 44 with additional information available from outside systems as in element 9 to create through an external API 369 to generate a fuller match. The fuller match is sent to a notification generation system 5011 where a specific advertisement, coupon, or discount for a product is generated and then presented to the consumer on a public display screen 60 or a mobile device screen 92.

Figure 12:
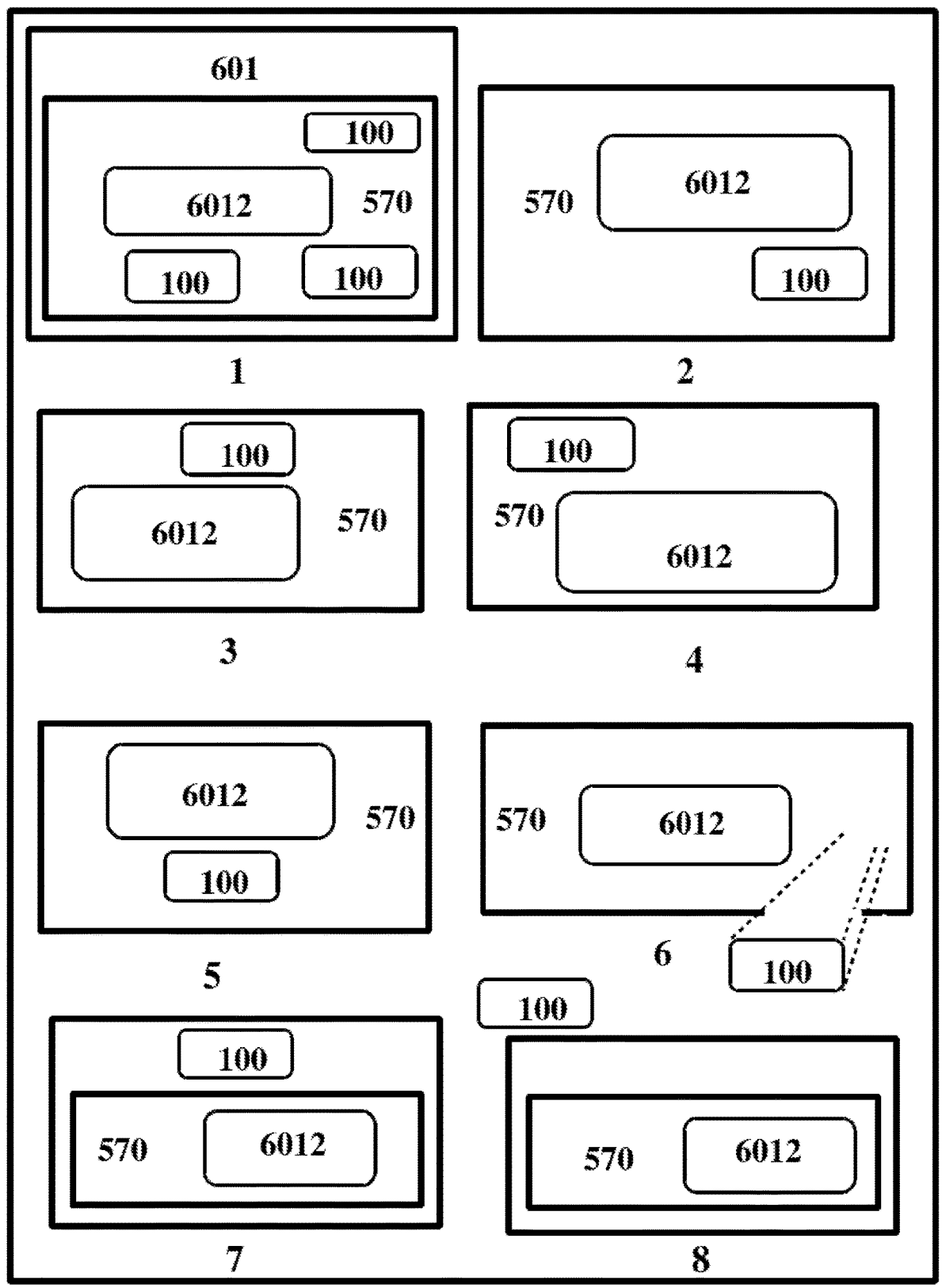
FIG. 12, in the preferred embodiment, shows diverse alternative placements of the component informing a user of the category or division of source or notification content presented to the user.

Referring now to FIG. 12, in the preferred embodiment, eight alternate placements of the component 100 informing a user of the category or division of source or notification content within the notification content 592 presented as a notification 6011 to the user is shown. An option response 6012 is shown appearing in association with the notification. In element 1, multiple alternate placements are shown within the notification content 592.

Figure 13:
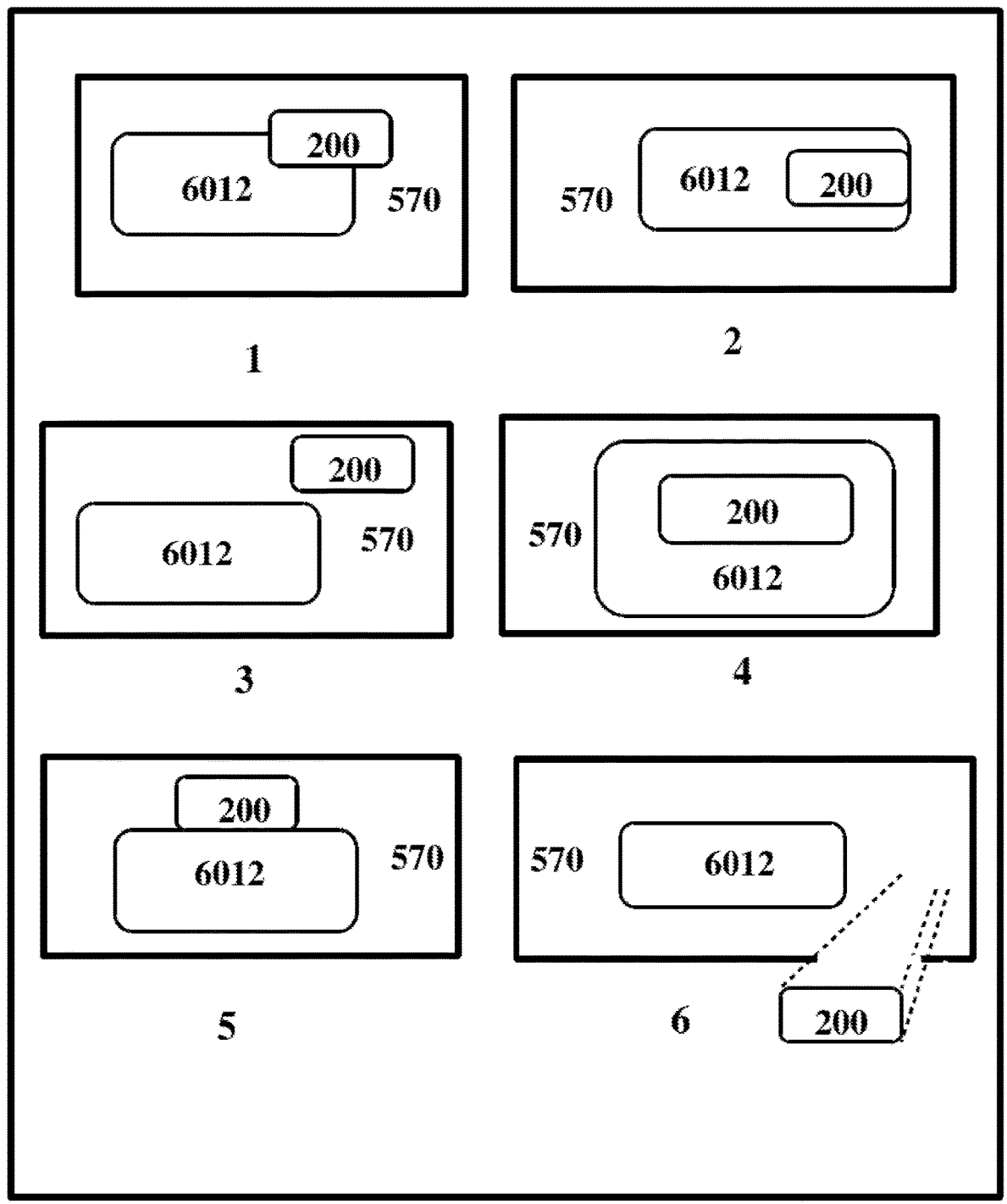
FIG. 13, in the preferred embodiment, shows diverse alternative placements of the component informing a user of the category or division of response vector for any or all of the response options that might be selected by the user.

Referring now to FIG. 13, in the preferred embodiment, diverse alternate placements of the component 200 informing a user of the category or division of response vector for any or all of the response options that might be selected by the user is shown. The component 200 and the response option 6012 may be shown with or without notification content 592. Element 6 shows the independent placement of the response option 6012, the notification content 592, and the category component 200.

Figure 14:
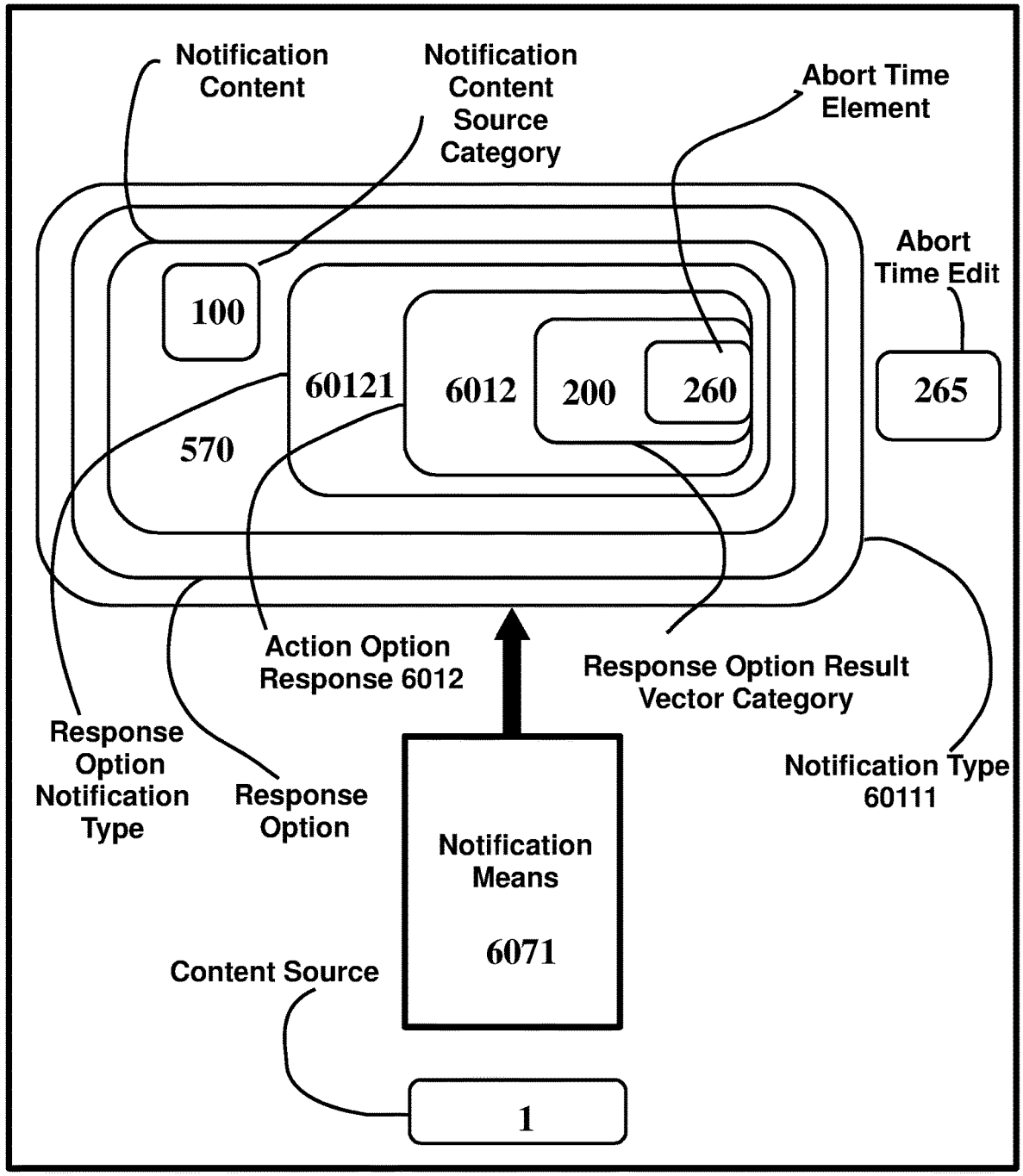
FIG. 14, in the preferred embodiment, shows the elements of the system and method including the notification of the response option consequential result vector and abort time.

Referring now to FIG. 14, in the preferred embodiment, the elements of the displayed components including the notification of the response option consequential result vector and abort time are shown.

Figure 15:
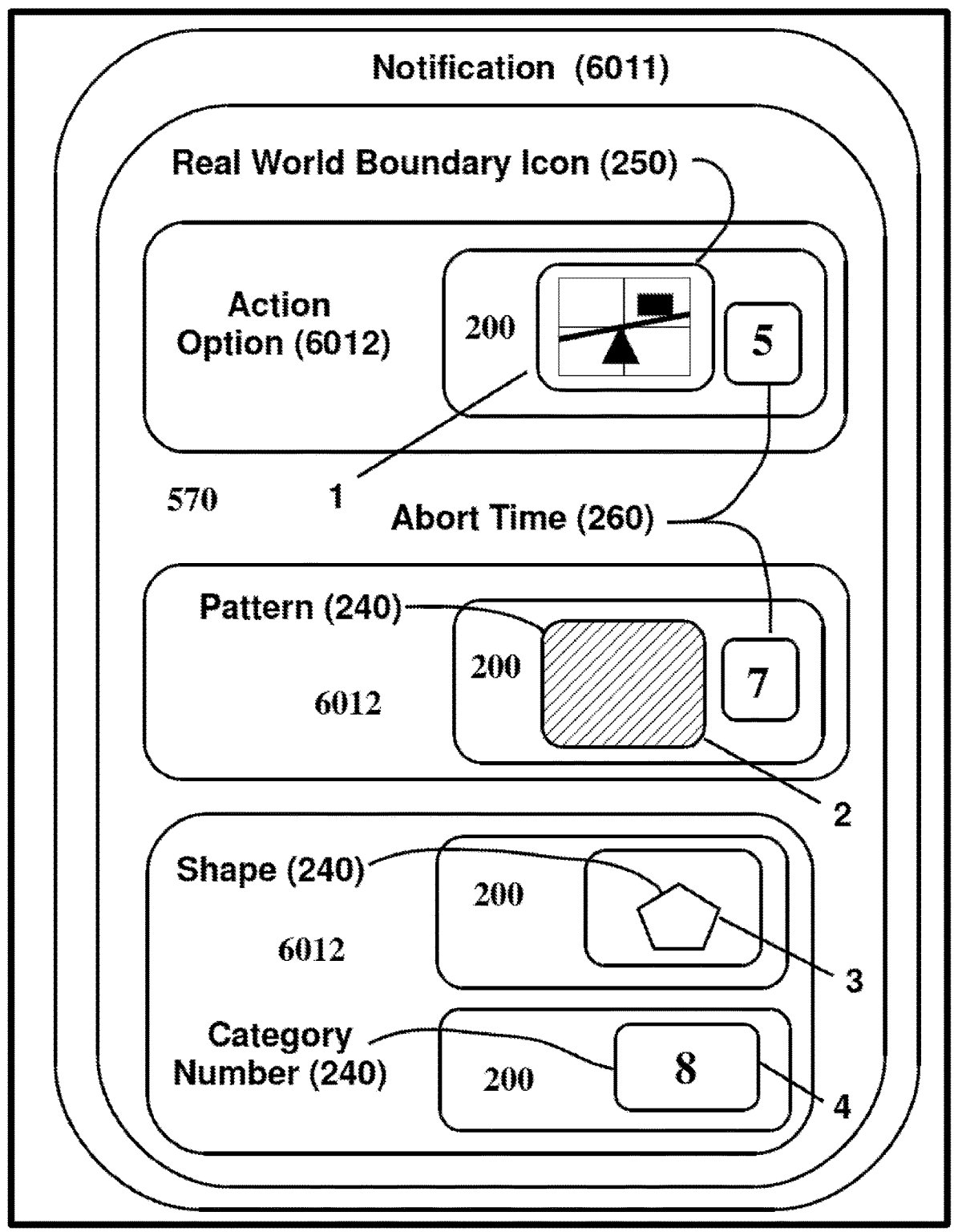
FIG. 15, in the preferred embodiment, shows an example of an element indicating the fact of the existence of a consequential real-world response result vector, or of an element indicating the category or division of the result vector that will arise from the selection of a response option.

Referring now to FIG. 15, in the preferred embodiment, an example in Element 1 of an element indicating the fact of the existence of a real-world response consequential result vector icon 250, or of an element indicating the category or division of the result vector that will arise from the selection of a response option in the form of, in Element 2, a pattern, in Element 3, a shape, or, in Element 4, a category number, or an abort time 260 representing a countdown of time after which a selection might not be reversed and therefore an action not aborted. More than one result vector may be illuminated for one result vector, whether equal, sequenced, or in largest to smallest or smallest to largest effect, or other means of establishing relationship amongst multiple effects.

Figure 16:
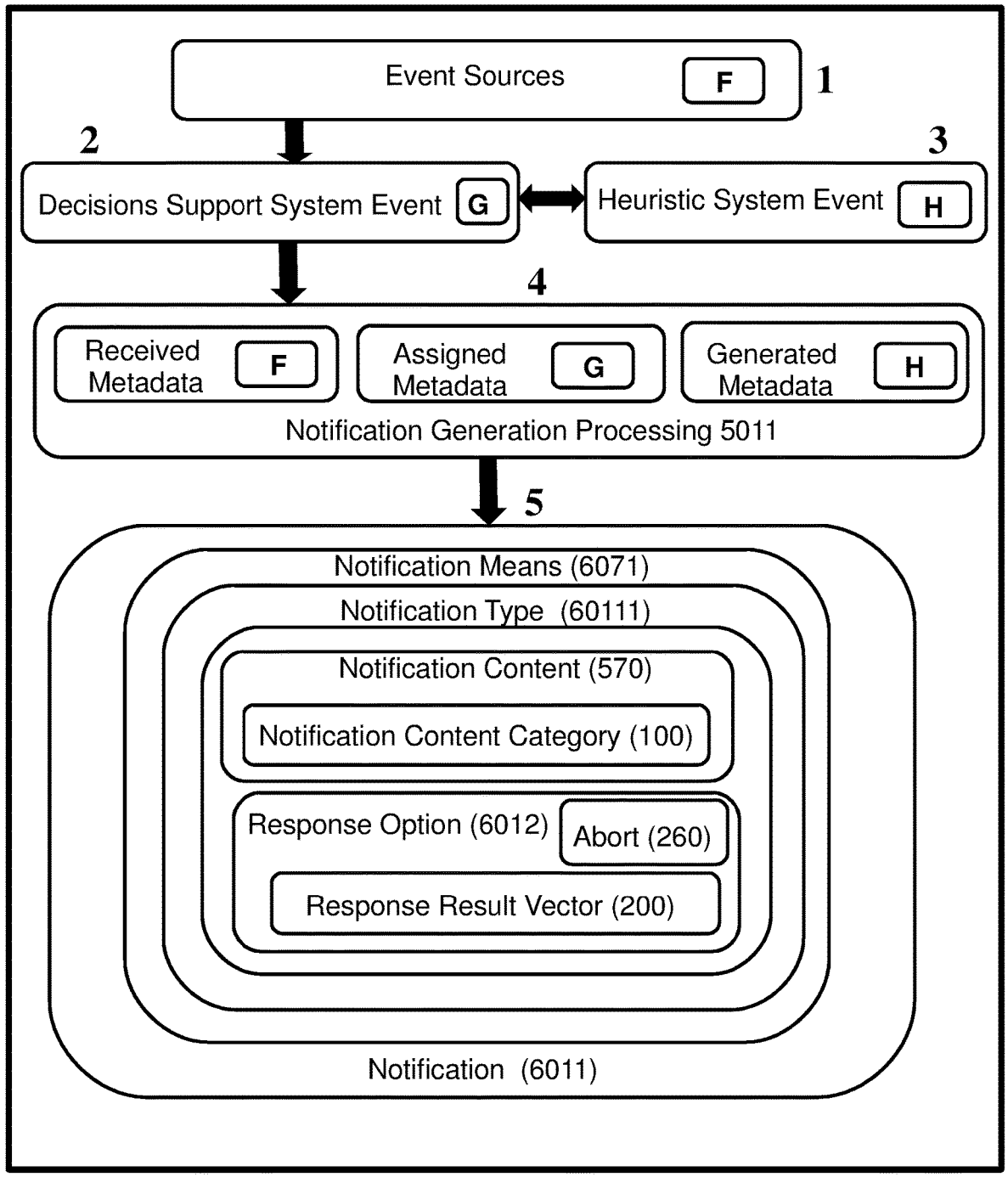
FIG. 16, in the preferred embodiment, shows the utilization and processing of meta data by a notification generation system in order to create and present the element of a notification of category or division of the source of notification content.

Referring now to FIG. 16, in the preferred embodiment, the utilization and processing of meta data by a notification generation system in order to create and present the element of a notification of category or division of the source of notification content 100 or of the response result vector 200 is shown. The system and method comprises, 1) in element 1, event sources as sensed events 1011 or processed events 201 with meta data F captured by any sensing means 101 are inputted into a hardware-software system comprising, a) in Element 2, a decisions support system 50 outputting meta data G, b) in element 3, a heuristic system 99991 outputting meta data H, c) in Element 4, a notification generation system 5011 utilizing meta data F, G, H to generate in d) Element 5 a notification 6011 presented through a notification means 6071 and notification type 60111 comprising (i) notification content 592 and its category or division of source 100, (ii) one or more response options 6012 and its category or division of consequential result vector 200, and an abort option 260. Attribution of an information source by category may be attached after being received from a source providing such attribution meta data along with its information, such as a sensing or input device, and may be assigned by simple correspondence by reading of the basic meta data of a sensing or device to determine and assign such category, or generated by the functioning of a hardware-software system using derivative or deductive processes, such as rules-based, symbolic logic, or pattern matching or recognition processes.

Meta data may be 1) permanently fixed attributes, such as a model of a hardware sensing device, 2) a dynamic register in which values change according to the location of a device, whether stationary or moving, 3) a dynamic register in which values change according to the time of the occurrence of an event, 4) assigned by a hardware-software system, 5) generated by a hardware-software system, 6) relayed by a hardware-software system, 7) received by a hardware-software system.

An event is any sensed change that the hardware or software developer or user of a hardware-software system utilizes, stores, or computes in any manner, or makes available to an external system through a data feed, application programming interface, or other to utilize, compute or store.

A notification means any information on a notifications means, including but not limited to, a computer display means, and including any modification, or alteration of that notification through time.

A mobile interaction or mobile device interaction means any interaction by a user with a mobile device, whether presently connected or not connected to a network.

A response interface means any means by which a notification becomes known to a user, including but not limited to a computer display means, including or not including the means for the user to make a response to that notification whether on that interface itself or through any other input means.

One skilled in the art might see there are various means of implementing or programming to achieve an implementation of the system herein described.

Further, one skilled in the art might see that are various ways to include or exclude the communication means in any position, part, or sequence of processing depending on the needs of the implementation.

Further, one skilled in the art might see that are various ways to distribute the functions of the system amongst response interfaces or computer display means, with various ways, means, or devices to supply the input and user input to the system on those response interfaces, computer device screens, or computer display means, private or public.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the intended claims.

What is claimed is:

1. A computerized hardware-software system for generating improved notifications relating to real-world events external to the system, the system comprising:
   a sensing network utilizing a distributed network architecture, said sensing network including, at a location remote to the user, at least one hardware-based sensor configured to sense real-world events external to the system;
   a software-based sensed-event processing system configured to encapsulate, in a uniquely defined logical container, recognition by the sensor of a remotely sensed real-world event external to the system, and to append, by a register associated with said uniquely defined logical container, metadata associated with said remotely sensed real-world event including metadata indicating at least one of: a time, a location, an event type, an event intensity level, a delta intensity level, a detection type, a detection certainty level, an association with a predefined event, a human danger level, a threat level, an environmental danger, a predefined event associated with a delta of change, a qualitatively rated event, or a type-classified event;
   said sensed-event processing system further configured to append metadata to the sensed remote event at the remote location utilizing a computer-enabled sensor;
   a computer digital display;
   at least one communication unit configured to process bi-lateral and multi-lateral communications amongst the sensing network, the sensed-event processing system, a notification generation system, and a decision support system;
   a decision support system configured to generate at least one user-selectable action option by identifying in a database one or more containers of at least one previously processed remotely sensed real-world event with appended metadata that matches metadata associated with a newly sensed real-world event, identifying in a database one or more action options associated with the one or more containers of at least one previously processed remotely sensed real-world event, determining which of the one or more action options identified has been most highly rated by one or more users by comparing the metadata associated with those action options with the metadata associated with the one or more action options selected by one or more users, and selecting from among the one or more action options the most highly rated of the one or more action options selected by one or more users in the past;
   said decision support system further configured to send at least one user-selectable action option to a notification generation system;
   said decision support system further configured to generate a decision support system event based on the metadata appended to the information associated with the detected change;
   said decision support system further configured to receive a rating, made by one or more users, of an action option presented on the computer digital display and to store that rating with any other rating associated with that action option; and
   a notification generation system configured to generate at least one notification containing at least one user-selectable action option to present on the computer digital display that, once selected by one or more users, actuates and effects an action in the real world external to the system;
   said notification generation system further configured to generate at least one notification containing at least one user-selectable action option to present on the computer digital display that, once selected by one or more users, would actuate and effect an action in the real world external to the system.

2. The system of claim 1, wherein the decision support system is further configured to generate a user-selectable action option accompanied by a symbol representing the category of result vector of the associated action option.

3. The system of claim 1, wherein the decision support system is further configured to present to one or more users a means for inputting a quantitative rating of the expected success of the action option selected in the real world external to the system, to send the rating to a database, and to associate the rating with that action option.

4. The system of claim 1, wherein the decision support system is further configured to receive a rating of the action option, said rating entered as data input after the action option has been selected by the user and the action has been effected in the real world external to the system.

5. The system of claim 1, wherein the notification generation system is further configured to deliver to the user a rating of an action option based upon historical results determined by the decision support system to have been successful in achieving a notification objective for at least one other user, and the decision support system is further configured to determine whether said historical results have been successful by reading the cumulative quantitative ratings of the action option made by one or more users after the action option has been selected by one or more users and the action has been effected in the real world external to the system.

6. The system of claim 1, wherein the decision support system is further configured to generate an action option using a branching rule system of if-then statements in software code based upon the metadata associated with a previously processed sensed event.

7. The system of claim 1, wherein the notification generation system is further configured to select a type of notification by searching a table in a database for the type of notification matching the category of result vector for the action option received and selecting the notification type with the highest cumulative score of ratings by more than one user.

8. The system of claim 1, further comprising a notification accompanied by an abort time indicating how long the user has to cancel the selected action option before the intended result of the action option becomes irreversible.

9. The system of claim 1, wherein the notification generation system is further configured to generate a notification that the user has failed to select any of the presented action options.

10. The system of claim 1, wherein the decision support system is further configured to append to a previously processed sensed event the metadata generated by a rules-based system analyzing action options rated most highly by one or more users.

11. The system of claim 1, wherein the decision support system is further configured to generate from accumulated metadata a new action option through the analysis of all container metadata.

12. The system of claim 1, wherein the notification generation system is further configured to append to an action option a symbol indicating to the user that selection of the action option will effect a real-world event external to the system.

13. The system of claim 1, wherein the notification generation system is further configured to append to an action option a means for the user to quantitively rate the effectiveness of the means of notification, and to store the user's rating in a database.

14. The system of claim 1, wherein the sensed event processing system is further configured to append metadata to a previously processed sensed event generated by a rules-based system analyzing action options rated by more than one user.

15. The system of claim 1, wherein the decision support system is further configured to utilize the rating of at least one action option from at least one user other than the primary user.

16. A computerized hardware-software system for generating improved notifications relating to real-world events external to the system, the system comprising:
a sensing network utilizing a distributed network architecture, said sensing network including a sensing device at a location remote from the user and configured to detect a change in a non-cyber, non-digital real world, wherein the change in the non-cyber, non-digital real world comprises a non-cyber, non-digital real-world event occurring external to the system;
a sensed-event processing system configured to append meta data to information associated with the detected change;
said sensed-event processing system further configured to append metadata to the sensed remote event at the remote location utilizing a computer-enabled sensor;
a computer digital display interface;
a decision support system configured to generate on a sensed-event processing system at least one user-selectable action option by identifying in a database one or more containers of at least one previously processed remotely sensed real-world event with appended metadata that matches metadata associated with a newly sensed real-world event, said user-selectable action option presenting an action that could be effected in the non-cyber, non-digital real world external to the system and occur at a location remote to the user;
said decision support system further configured to generate a decision support system event based on the metadata appended to the information associated with the detected change;
at least one communication unit configured to enable communication between the notification generation system and the computer digital display interface; and
a notification generation system configured to: generate a notification and deliver to a computer display a first notification comprising at least one user-selectable action option capable of effecting an action in the non-cyber, non-digital real world external to the system and occurring at a location remote to the user;
said notification generation system further configured to deliver to the user on a computer display the means to quantitatively rate the effectiveness of the notification type;
said notification generation system further configured to store the rating given by the user in a database containing more than one rating from more than one user;
said notification generation system further configured to select a type of notification by searching a table in a database for the type of notification matching the category of result vector for the action option received and selecting the notification type with the highest cumulative score of ratings by more than one user.

17. The system of claim 16, wherein the notification generation system is further configured to deliver a category of result vector for the action option to the user on a computer display by searching a table in a database for the category of result vector associated with the action option, selecting that category of result vector, and delivering it to the user on a computer display utilizing a communication means.

18. The system of claim 16, wherein the decision support system is further configured to generate the at least one user-selectable action option based upon an action option previously selected.

19. The system of claim 16, wherein the decision support system is further configured to receive data relating to a response to the first notification.

20. The system of claim 16, wherein the notification generation system further comprises an external data input configured to receive data from a location external to the system, and wherein the first notification is based on the data received from the external data input.

21. The system of claim 16, further comprising a rules system configured to generate rules governing a selection and communication of the first and second notifications.

22. The system of claim 21, wherein the rules are based on a predefined time period.

23. The system of claim 21, wherein the rules are based on a geographic area.

24. The system of claim 21, further comprising a heuristic system configured to analyze the first notification and the response to the first notification, and wherein the notification generation system is further configured to generate a second notification based on data received from the heuristic system.

25. The system of claim 24, wherein the data received from the heuristic system comprises a user evaluation of one or more past notifications, including the first notification.

26. The system of claim 24, wherein the data received from the heuristic system comprises data relating to one or more of: metadata associated with past notifications, a specific event, an event type, an event intensity, an event urgency, an event class, a user, a user type, a user training level, a user rank, a user age, a user sex, a user class, a specific notification, a specific notification type, a notification level, a notification means, event patterns, a location, a time, or a snapshot of the system.

27. The system of claim 26, wherein the at least one user-selectable action option of the second notification is based on the data received from the heuristic system.

28. The system of claim 21, further comprising a heuristic system configured to determine historically successful responses to the first notification by reading the cumulative quantitative rating of an action option rated after the action option has been selected by the user and the action presented has been effected in the real world external to the system.

29. The system of claim 16, wherein the response to the first notification comprises one or more of: a response time to the selection of the at least one user-selectable action option of the first notification, a response time to the rejection of the at least one user-selectable action option of the first notification, a response time to the selection of an alternate set of user-selectable action options, a selection of the alternate set of user-selectable action options, a failure to respond to the at least one user-selectable action options of the first notification within a predefined time period, or an action taken by a user in the real world external to the system.

30. The system of claim 16, further comprising a computer-enabled hardware sensor at a location remote to a user and capable of encapsulating in a uniquely defined logical container recognition of a remotely sensed physical event in the non-cyber, non-digital real world external to the system; said sensor further configured to append by register to said uniquely defined logical container metadata associated with said remotely sensed physical event including at least one of the following: a time, a location, an event type, an event intensity level, a delta intensity level, a detection type, a detection certainty level, an association with a predefined event, a human danger level, a threat level, an environment danger, an asset threat level, a predefined event associated with a delta of change, a qualitatively rated event, or a type-classified event; said sensor further configured to send that uniquely defined logical container with its appended registers to the decision support system.

31. The system of claim 16, wherein the sensed event is at least one of: a change in heart rate, a change in blood pressure, or a change in the degree of iris dilation.

32. The system of claim 16, wherein the system is further configured, upon selection of the user-selectable action option, to effectuate an action in the non-cyber, non-digital real world occurring external to the system.

33. The system of claim 16, wherein the system is further configured, upon selection of the user-selectable action option, to effectuate an action in a cyber, digital environment occurring internal to the system.

34. A system for improving networked computer processing and generating improved notifications utilizing a specific element on a computer digital display indicating the category of the result vector that will arise in the real world from the user's selection of an action option, the system comprising:
   a computer digital display interface;
   a sensing network utilizing a distributed network architecture, said sensing network including a sensing device at a location remote to the user and configured to detect a change in a non-cyber, non-digital real world, wherein the change in the non-cyber, non-digital real world comprises a non-cyber, non-digital real-world event occurring external to the system;
   a software-based sensed-event processing system configured to encapsulate, in a uniquely defined logical container, recognition by the sensor of a remotely sensed real-world event external to the system, and to append, by a register associated with said uniquely defined logical container, metadata associated with said remotely sensed real-world event including metadata indicating at least one of: a time, a location, an event type, an event intensity level, a delta intensity level, a detection type, a detection certainty level, an association with a predefined event, a human danger level, a threat level, an environmental danger, a predefined event associated with a delta of change, a qualitatively rated event, or a type-classified event;
   said sensed event processing system further configured to append metadata to the sensed remote event at the remote location utilizing a computer-enabled sensor;
   a decision support system configured to generate at least one user-selectable action option by identifying in a database one or more containers of at least one previously processed remotely sensed real-world event with appended metadata that matches metadata associated with a newly sensed real-world event, identifying in a database one or more action options associated with the one or more containers of at least one previously processed remotely sensed real-world event, determining which of the one or more action options identified has been most highly rated by one or more users by comparing the metadata associated with those action options with the metadata associated with the one or more action options selected by one or more users, and selecting from among the one or more action options the most highly rated of the one or more action options selected by one or more users in the past;
   said decision support system further configured to generate a decision support system event based on the metadata appended to the information associated with the detected change;
   a notification generation system configured in software code to receive over a computer network an action option to be presented to a user on a computer digital display, capable, once an action option is selected, of effecting an action in the non-cyber, non-digital real world external to the system and occurring at a location remote to the user;

said notification generation system further configured to match to said action option an associated category of result vector of the action option, said category of result vector received from a database of action options;

said notification generation system further configured to generate a notification presenting the action option and the category of result vector of the action option together on the computer display screen for user selection;

said notification generation system further configured to cause, upon selection of an action option, and through a computer network, a real-world device with non-cyber, non-digital operating components to effect an action in the non-cyber, non-digital real world external to the system and occurring at a location remote to the user;

said notification generation system further configured to record the user selection in a database.

35. The system of claim 34, further comprising a notification on the computer digital display interface indicating how many times the action option has been selected in the past.

* * * * *